(12) United States Patent
Ito

(10) Patent No.: US 7,699,594 B2
(45) Date of Patent: Apr. 20, 2010

(54) METHOD AND APPARATUS FOR SUPPLYING LABEL TO PSEUDO-CORE IN IN-MOLD LABELING SYSTEM

(75) Inventor: Tatunari Ito, Aichi-ken (JP)

(73) Assignee: Star Seiki Co., Ltd., Nagoya-shi (JP)

( * ) Notice: Subject to any disclaimer, the term of this patent is extended or adjusted under 35 U.S.C. 154(b) by 1016 days.

(21) Appl. No.: 11/263,625

(22) Filed: Oct. 31, 2005

(65) Prior Publication Data
US 2007/0017629 A1    Jan. 25, 2007

(30) Foreign Application Priority Data
Jul. 21, 2005    (JP) ............................. 2005-210959

(51) Int. Cl.
B23B 31/10    (2006.01)

(52) U.S. Cl. .................... 425/126.1; 425/503; 425/504; 264/547; 264/550

(58) Field of Classification Search ............. 425/126.1, 425/121, 125, 503, 504, 112, 111, 127; 264/547, 264/550
See application file for complete search history.

(56) References Cited

U.S. PATENT DOCUMENTS 5,980,233 A * 11/1999 Oosaki ....................... 425/503
6,264,876 B1 * 7/2001 Ballay ........................ 264/509

FOREIGN PATENT DOCUMENTS

| JP | 05-285981 | 11/1993 |
| JP | 2001-062866 A | 3/2001 |
| JP | 2002-144382 A | 5/2002 |
| JP | 2004-148747 A | 5/2004 |

OTHER PUBLICATIONS

Machine Translation of JP 05-285981.*

* cited by examiner

Primary Examiner—Richard Crispino
Assistant Examiner—Christopher Schatz
(74) Attorney, Agent, or Firm—Frishauf, Holtz, Goodman & Chick, P.C.

(57) ABSTRACT

A method and an apparatus for supplying a label to a pseudo-core with the label held in the right position that can reduce the rate of producing defective molded products. They also can delivery a label with reduced suction force for drawing the label so as to downsize the apparatus and reduce the cost. A label 25 that is sucked and held at least at a longitudinal central part thereof is introduced into a pseudo metal mold 23 having a hollow section 23a whose inner surface shows a profile substantially agreeing with the outer profile of a corresponding pseudo-core and an aperture section 23b communicating with the hollow section 23a by way of pseudo metal mold 23 so as to extend along the inner surface of the hollow section 23a, while it is being resiliently deformed. Subsequently, the label 25 is supplied to the pseudo-core 21 coming into the hollow section 23a of the pseudo metal mold 23.

4 Claims, 27 Drawing Sheets

METHOD AND APPARATUS FOR SUPPLYING LABEL TO PSEUDO-CORE IN IN-MOLD LABELING SYSTEM

BACKGROUND OF THE INVENTION

1. Field of the Invention

This invention relates to a method and an apparatus for supplying a label in an in-mold labeling system to a pseudo core so as to be placed in position in the inside of a metal mold by the pseudo-core at a high level of accuracy. The method and apparatus are applicable in a label insert molding operation including the step of molding synthetic resin integrally with a label placed in position in a metal mold and wherein the label has a desired design of letters and/or a graphic printed thereon.

2. Description of the Related Art

Known techniques in the field of label insert molding where products such as cups, containers and etc. are produced by molding integrally with a label on the surface, the label carrying a desired design of letters and/or a graphic printed thereon, include the one disclosed in Japanese Patent Application Laid-Open Publication No. 5-285981. According to the patent document, a label is wound around a pseudo-core showing an outer profile exactly agreeing with that of the expected molded product and having a large number of suction pores on the outer surface thereof. Then, the label is drawn and held in position around the pseudo-core and the pseudo-core is brought into the metal mold with the label wound around it. Subsequently, the label is released from the drawn and held state and inversely drawn to the metal mold so as to be placed in position in the latter.

When the label is held in the state of being wound around the outer surface of the pseudo-core with the above described label placement method, a longitudinally middle part of the uppermost layer of the multilayer label is brought close to a part of the outer surface of the pseudo-core and the label is drawn to the latter so that the label may be resiliently deformed by the suction force and wound around the entire outer surface of the pseudo-core.

However, the above described method is designed to draw the label along the longitudinal peripheral edges thereof so as to make it wound around the outer surface of the pseudo-core and hence requires the pseudo-core to exert a strong label drawing force onto the label. Therefore, it requires the use of a large negative pressure (vacuum) generating apparatus, which by turn makes the entire delivery system large and costly.

Additionally, when the label is resiliently deformed and wound around the outer surface of the pseudo-core, the attitude of the label, that of the longitudinal peripheral edges thereof in particular, can easily be distorted to make the label that, which is wound around the pseudo-core, very unstable. When the label is wound around, held by the pseudo-core in an unstable state and placed in position in the metal mold for molding, the label can easily be displaced relative to the molded product and/or creased to make the molded product a defective one.

SUMMARY OF THE INVENTION

In view of the above-identified circumstances, it is therefore an object of the present invention to provide a method and an apparatus for supplying a label to a pseudo core in an in-mold labeling system with the label held in the right position so that the rate of producing defective molded products is reduced in comparison with prior art methods and apparatuses. Another object of the present invention is to provide a method and an apparatus for supplying a label to a pseudo-core in an in-mold labeling system with reduced suction force for drawing the label so as to downsize the apparatus and reduce the cost.

DETAILED DESCRIPTION OF THE PREFERRED EMBODIMENTS

First Embodiment

Now, the present invention will be described in greater detail by referring to the accompanying drawings that illustrate preferred embodiments of the invention.

Figure 1:
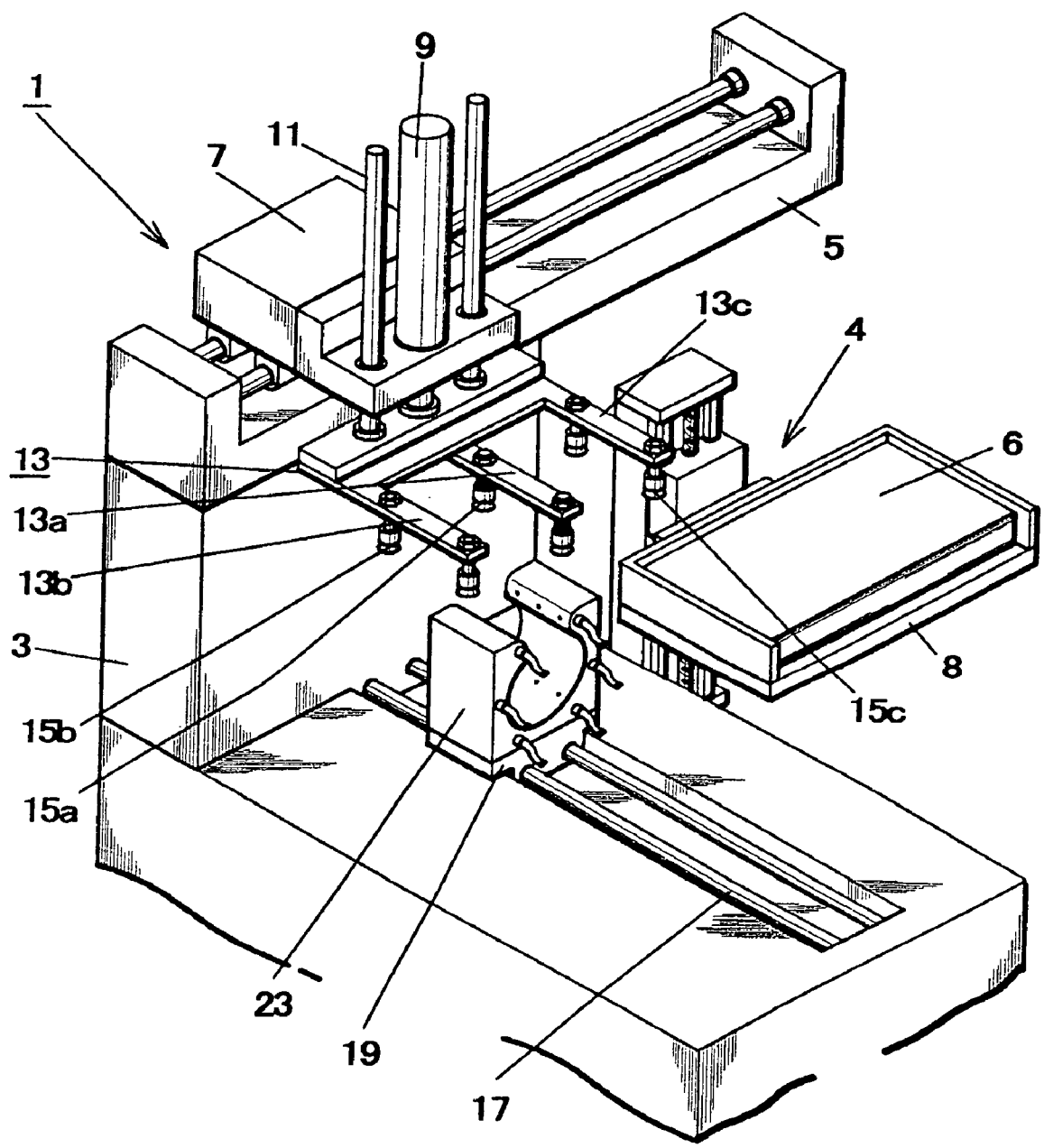
FIG. 1 is a schematic perspective view of a label supplying apparatus according to the invention.
Figure 2:
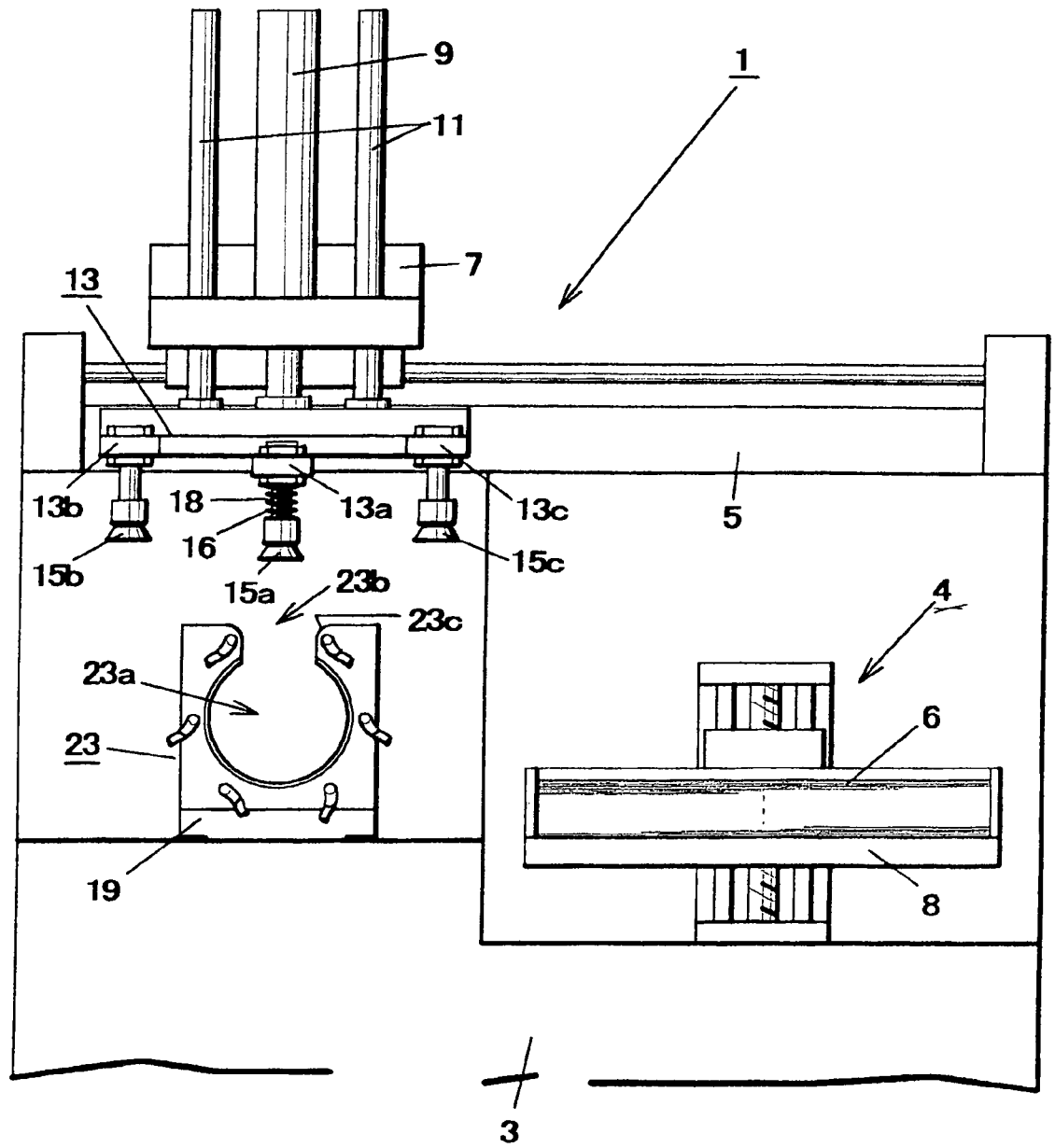
FIG. 2 is a schematic front view of the label supplying apparatus of FIG. 1.
Figure 3:
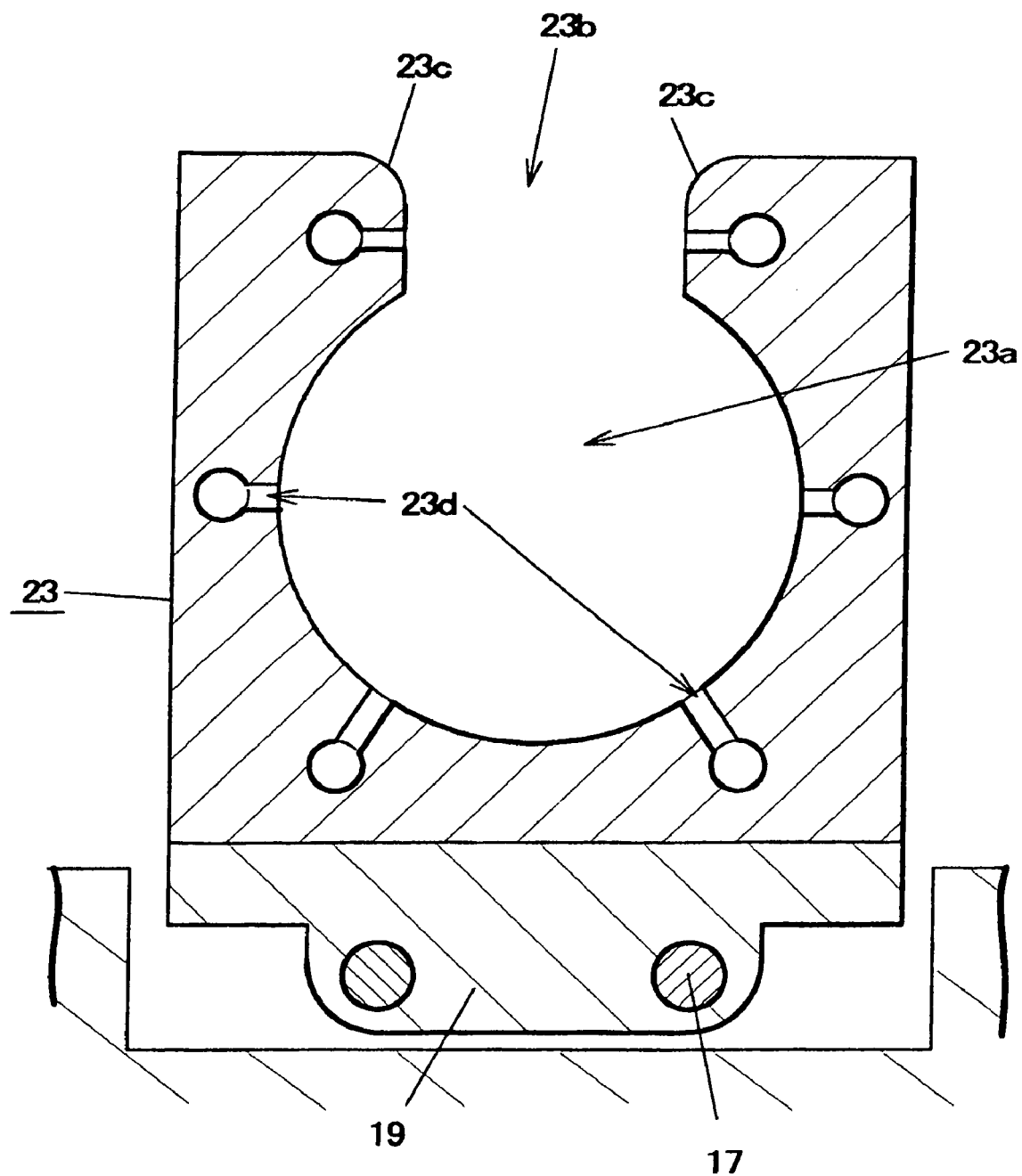
FIG. 3 is a schematic longitudinal cross sectional view of the pseudo-metal mold.

Referring firstly to FIGS. 1 through 3 illustrating the first embodiment of the present invention, label supplying apparatus 1 comprises a main body 3 that includes a traveling frame 5 extending transversally (from left to right in FIG. 2) and supporting a slider 7 so as to allow the slider 7 to reciprocate. The traveling frame 5 is driven to travel and reciprocate between a label takeout position arranged at an end of the traveling frame 5 and a label feed position for feeding a label 25 to pseudo metal mold 23, which will be described in greater detail hereinafter, by a reciprocation drive mechanism (not shown).

The reciprocation drive mechanism may be a belt drive mechanism adapted to drive an endless belt or a finite belt by means of an electric motor, a feed screw mechanism for driving a feed screw to rotate by means of an electric motor, a linear motor, a cylinder or some other mechanism.

A label feed unit 4 is arranged at the label takeout position of the traveling frame 5. The label feed unit 4 is adapted to drive up and down a receiving table 8 for receiving a group of stacked labels 6 in such a controlled manner that the uppermost layer of the group of labels is constantly held to a predetermined level.

A lift drive member 9 such as a feed screw is linked to a cylinder or an electric motor that is provided with a vertical-shaft and fitted to the slider 7. A pair of guide shafts 11, which are vertical shafts, is arranged at respective opposite lateral sides of the lift drive member 9 and supported by the slider 7 so as to be able to slide vertically. The base section of an anchor plate 13 is rigidly secured to the power shaft 9a of the lift drive member 9 and the lower ends of the guide shafts 11.

The anchor plate 13 has three arms 13a, 13b, 13c extending in a direction perpendicular to the longitudinal direction of the traveling frame 5 (to be referred to as back and forth direction hereinafter) and arranged at predetermined intervals 13d, 13e, which will be described in greater detail hereinafter. Three pairs of sucking/holding members 15a, 15b, 15c, each pair having a front member and a rear member, are fitted respectively to the lower surfaces of the front ends of the central arm 13a and the lateral arms 13b, 13c with their sucking/holding planes directed downward. The lateral pairs of sucking/holding members 15b, 15c are arranged in such a way that they are located at a level slightly above the level of the central pair of sucking/holding members 15a.

The central pair of sucking/holding members 15a is supported by the arm 13a so as to be able to slide and fitted to the lower end of shaft 18 that is urged downward by a resilient member 16 such as a compression spring. The central pair of sucking/holding members 15a and the lateral pairs of sucking/holding members 15b, 15c are connected to a negative pressure (vacuum) generating apparatus by way of respective valves (not shown) that are controlled so as to become open and closed independently. Thus, the central pair of sucking/holding members 15a and the lateral pairs of sucking/holding members 15b, 15c are controlled separately for respective suction operations.

A support member 17, which may be a rail or a guide shaft extending in the back and forth direction, is fitted to the main body 3 located at the side of the label feed position and a movable body 19 is supported by the support member 17 so as to be able to reciprocate in the back and forth direction. The movable body 19 is driven by the reciprocation drive mechanism (not shown) to reciprocate between a label receiving position and a label supplying position where it delivers a label to a pseudo-core 21 as will be described in greater detail hereinafter. As pointed out above, the reciprocation drive mechanism may be a belt drive mechanism, a feed screw mechanism, a cylinder, a linear motor or some other mechanism.

The pseudo metal mold 23 is fitted to the movable body 19. The pseudo metal mold 23 has a width extending in the back and forth direction that is slightly smaller than the width of the pairs of sucking/holding members 15a, 15b, 15c, or the interval separating the members of each of the pairs, also as viewed in the back and forth direction and a width extending in the transversal direction that is equal to the intervals 13d, 13e. A hollow section 23a is formed in the inside of the pseudo metal mold 23. The hollow section 23a shows a profile of a frustum of circular cone, a cylinder, a prism or some other form with its axial line extending in the back and forth direction in the inside thereof. The pseudo metal mold 23 has an aperture section 23b located at the top thereof and having a predetermined width extending in the back and forth direction right below the above described arm 13a. Thus, the inside of the pseudo metal mold 23 is in communication with the outside thereof by way of the aperture section 23b.

The pseudo metal mold 23 has rounded edges 23c extending along the lateral edges of the aperture section 23b and adapted to be resiliently deformed to become curved when a label 25 is forcibly introduced into the hollow section 23a of the pseudo metal mold 23.

The pseudo metal mold 23 is provided on the inner surface of the hollow section 23a thereof with a large number of suction pores 23d connected to a negative pressure (vacuum) generating apparatus so that the label 25 that is introduced into the hollow section 23a is drawn by the negative pressure and tightly adheres to the inner surface of the hollow section 23a.

The pseudo-core 21 is arranged at the label supplying position so as to be movable under control. The pseudo-core 21 is fitted to a chuck plate 27 to which a chuck member 29 is also fitted to hold a molded product (not shown) typically in a molded product takeout machine (not shown) that is mounted on a resin molding machine (not shown). More specifically, the chuck member 29, which is a sucking/holding member for holding a molded product, is fitted to one of the opposite main surfaces of the chuck plate 27 while the above described pseudo-core 21 is fitted to the other main surface of the chuck plate 27. The chuck plate 27 is adapted to selectively place either the chuck member 29 or the pseudo-core 21 vis-a-vis a metal mold 31 as it is rotated horizontally by 180 degrees selectively in either direction under control.

The pseudo-core 21 has an outer profile that substantially agrees with a molded product that is molded integrally with a label 25 fitted to the surface thereof As pointed out above, a large number of suction pores 21a are formed on the outer surface thereof and held in communication with a negative pressure (vacuum) generating apparatus. The label 25 is wound around the outer surface of the pseudo-core 21 in the drawn and held state. When necessary, a compressed air generating apparatus (not shown) is connected to the pseudo-core 21 and compressed air is blown to the label 25 through the suction pores 21 in order to press the label 25 against the inner surface of the recess 31a of the metal mold 31 and force it to adhere to the inner surface at a timing substantially synchronized with the timing of releasing the label 25 from the sucked and held state when the pseudo-core 21 holding the label 25 is brought into the recess 31a of the metal mold 31.

Now, the method and the effect of supplying a label 25 to the pseudo-core 21 will be discussed below.

Firstly, the reciprocating drive mechanism is operated to drive the slider 7 to move to the label take out position of the traveling frame 5. Then, the lift drive member 9 is operated to drive the sucking/holding members 15a, 15b, 15c to move until they contact or come close to the top surface of the label 25 of the uppermost layer of the group of labels 6 and the label 25 is drawn and held at a longitudinal central part thereof by the central pair of sucking/holding members 15a and at longitudinal lateral parts thereof respectively by the lateral pairs of sucking/holding members 15b, 15c.

Figure 4:
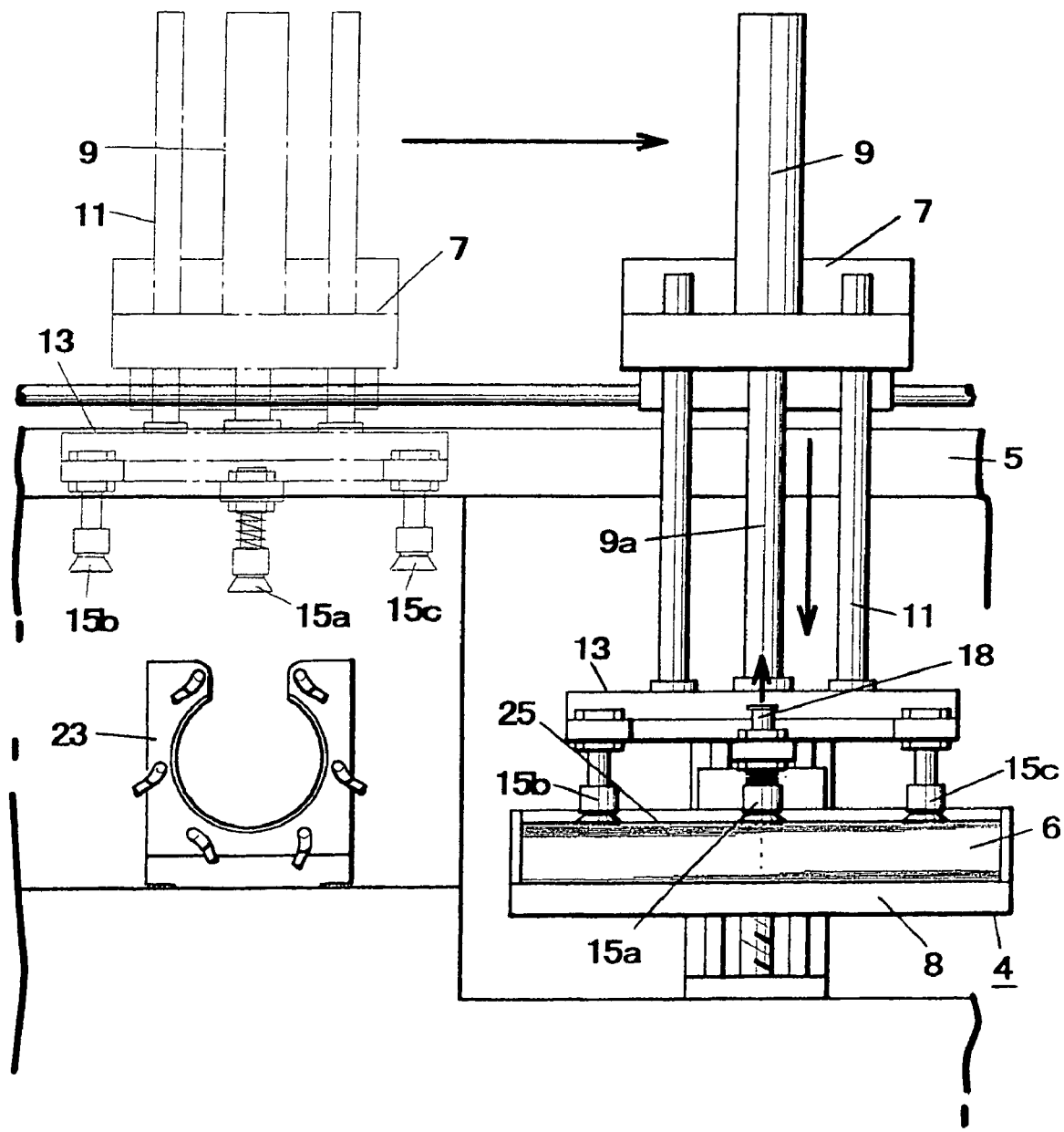
FIG. 4 is a schematic illustration of a state where a label is taken out by means of a sucking/holding member.

The sucking/holding planes of the central pair of sucking/holding members 15a is located at a level lightly lower than the level of the sucking/holding planes of the lateral pairs of sucking/holding members 15b, 15c as pointed out earlier. However, when the central pairs of sucking/holding members 15a touches the upper surface of the label 25, it is forced to move upward against the resilient force of the resilient member 16 to become flush with the sucking/holding planes of the other pairs of sucking/holding members 15b, 15c (see FIG. 4).

Figure 5:
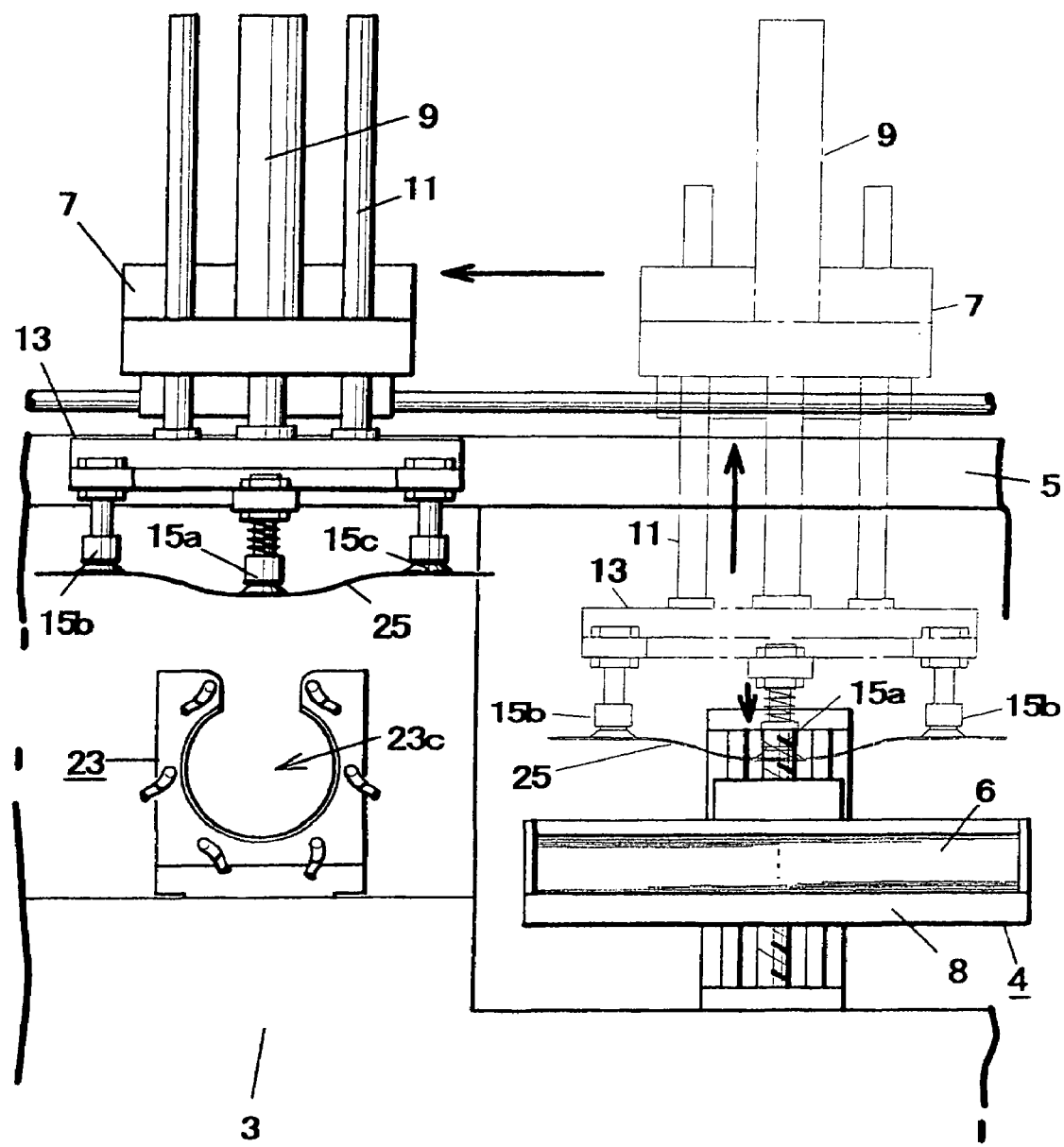
FIG. 5 is schematic illustration of a state where the sucking/holding member that is sucking/holding the label moves above the pseudo metal mold.

Then, the lift drive member 9 is operated reversely to drive the pairs of sucking/holding members 15a, 15b, 15c, which are now drawing and holding the label 25, to move upward. Thereafter, the reciprocation drive mechanism is operated reversely to drive the slider 7 to move back to the label feed position and shift the pairs of sucking/holding members 15a, 15b, 15c upward. At this time, the central pair of sucking/holding members 15a that is drawing and holding the label 25 at a central part of the latter is forced to move downward by the resilient force of the resilient member 16 so that the label 25 is lifted at longitudinal lateral parts thereof earlier than at a longitudinal central part thereof and reliably separated from the remaining labels of the underlying layers of the group of labels 6 (see FIG. 5).

Figure 6:
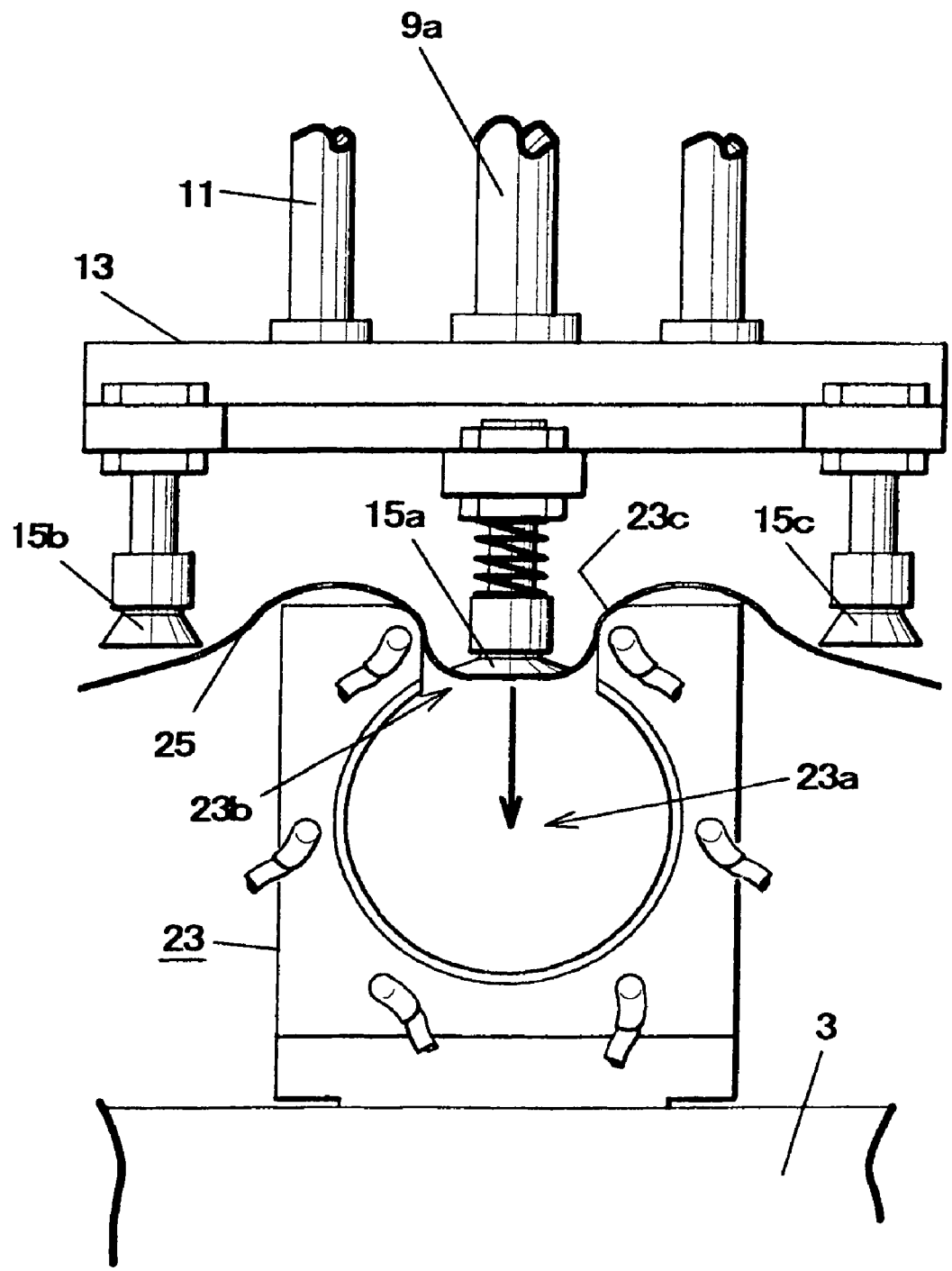
FIG. 6 is a schematic illustration of an initial incoming state of the label relative to the pseudo metal mold.
Figure 7:
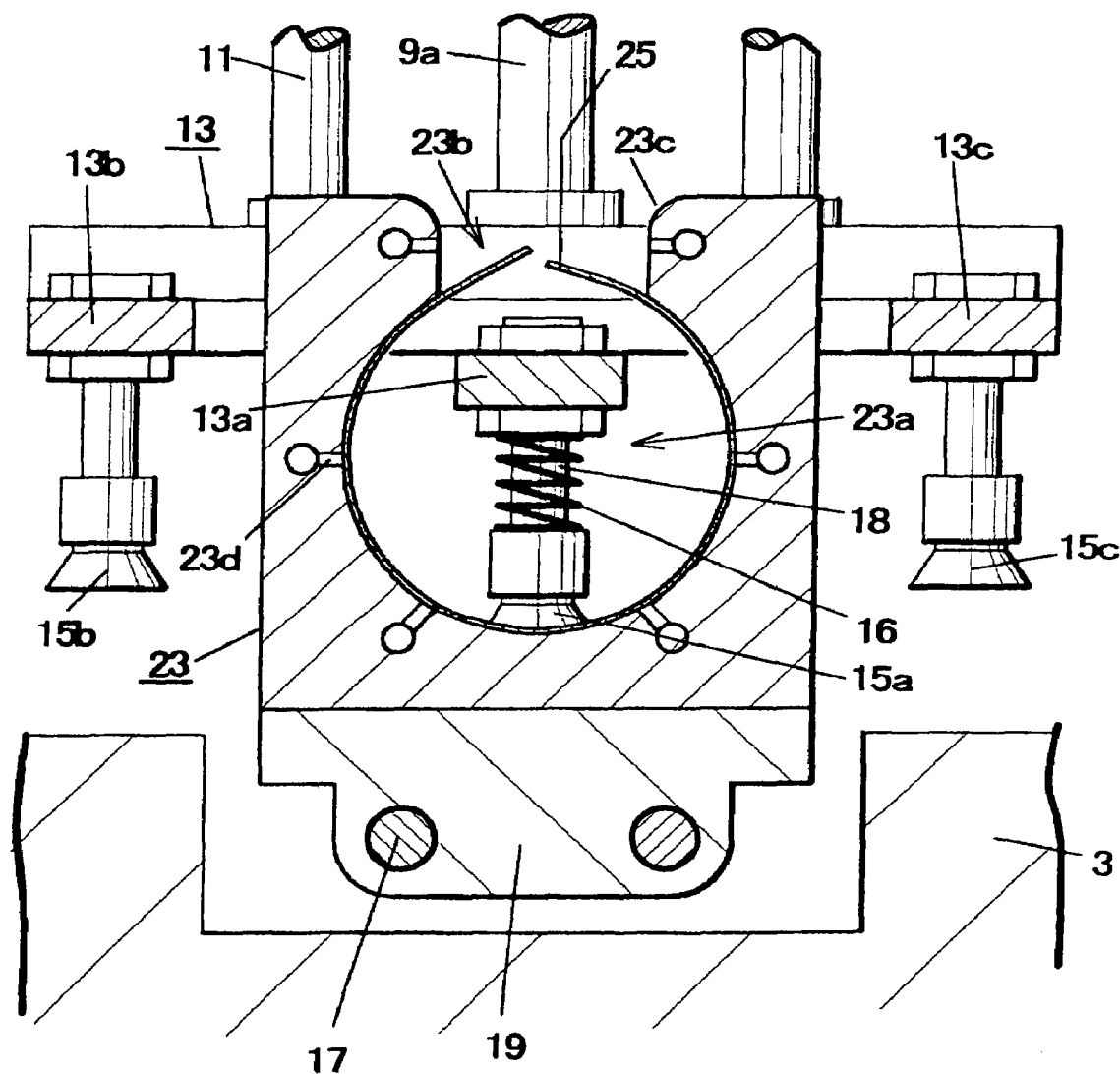
FIG. 7 is a schematic illustration of a state where the label is driven into the pseudo metal mold.

Then, the lift drive mechanism 9 is operated to drive the anchor plate 13 to move downward and, at the same time, the label 25 is released from the lateral pairs of sucking/holding members 15b, 15c while it is still drawn and held by the central pair of sucking/holding members 15a. As a result, the label 25 is resiliently deformed and pushed into the hollow section 23a of the pseudo metal mold 23 through the aperture section 23b. Since the label 25 is released from the lateral pairs of sucking/holding members 15b, 15c and hence free at the lateral edges thereof, the lateral edges of the label 25 is turned upward by the resistance of air and the label 25 is smoothly pushed into the hollow section 23a as it moves downward (see FIGS. 6 and 7).

The label 25 that is now pushed into the hollow section 23a is deformed so as to extend along the inner surface of the hollow section 23a because of its resilience. Then, as the label 25 is drawn by the negative pressure applied to it through the suction pores 23d and tightly held to the inner surface of the hollow section 23a.

Then, the label 25 is released from the central pair of sucking/holding members 15a and the lift drive member 9 is operated reversely to drive the anchor plate 13 to move upward to the original position and complete the process of supplying and fitting the label 25 to the pseudo metal mold 23.

Figure 8:
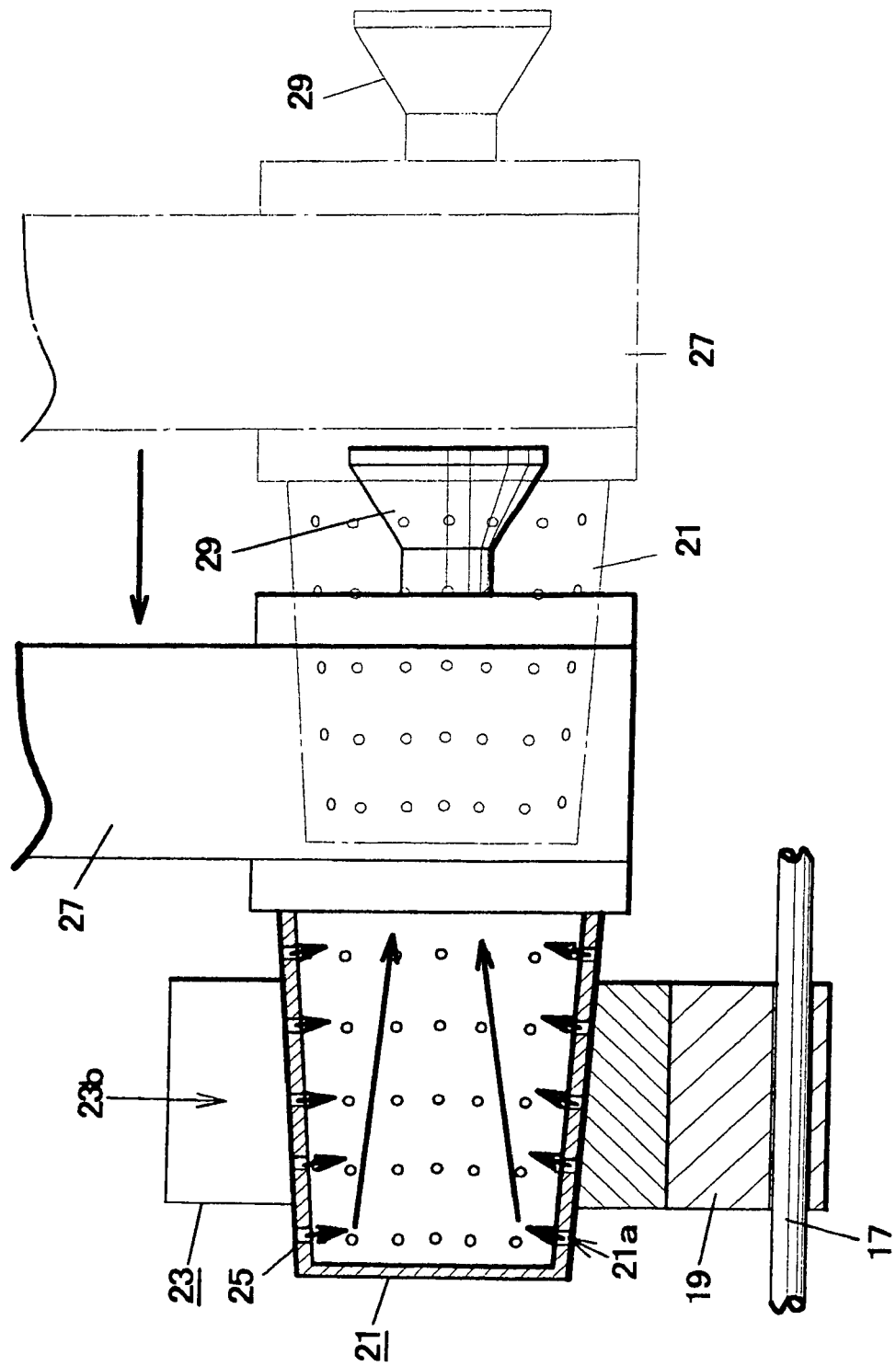
FIG. 8 is a schematic illustration of a state where the label is supplied to the pseudo-core.

Then, the chuck plate 27 is driven to move under control so as to bring the pseudo-core 21 into the hollow section 23a of the pseudo metal mold 23 that is holding the label 25. Subsequently, the label 25 is released from the state of being drawn and held by the suction pores 23d and, at the same time, drawn and held to the entire outer surface of the pseudo-core 21 by the suction force applied to it through the suction pores 21a. As a result, the label 25 that is resiliently deformed to make itself agree with the profile of the inner surface of the hollow section 23a in the pseudo metal mold 23 is supplied to the pseudo-core 21. With this arrangement, the label 25 is prevented from being displaced when it is held by the pseudo-core 21 (see FIG. 8).

Figure 9:
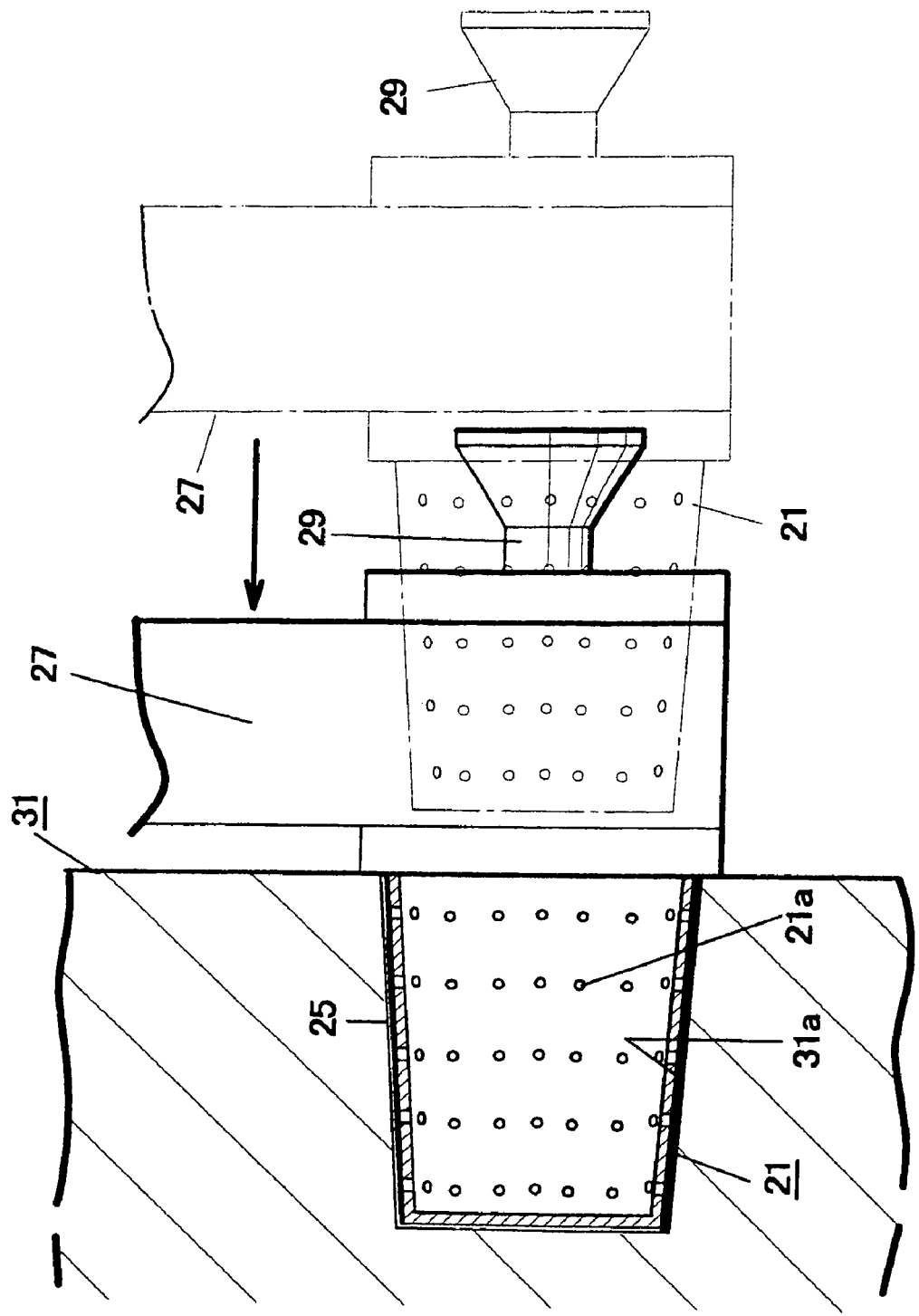
FIG. 9 is a schematic illustration of a state where the label is placed in position in the metal mold.

The pseudo-core 21, around which the label 25 is wound, is then brought into the recess 31a of the metal mold 31 of the resin molding machine as the chuck plate 27 is driven to move under control and subsequently, the label 25 is released from the drawn and held state and placed in position in the recess 31a. At this time, as the label 25 is released from the pseudo-core 25, negative pressure is formed in the inside of the recess 31a so as to make the label 25 tightly adhere to the inner surface of the recess 31a (see FIG. 9).

Since the label 25 is supplied to the pseudo-core 21 in a state where it is resiliently deformed and held in position by the pseudo metal mold 23 so as to match the profile of the pseudo-core 21 in this embodiment, the label 25 is reliably prevented from being displaced when it is supplied to the pseudo-core 21. Then, it can be placed in position in the metal mold with a stable attitude to prevent a defective molded product from being formed.

It is possible to use a small and low output negative pressure (vacuum) generating apparatus that is to be connected to the pseudo-core 21. Thus, it is possible to reduce the overall dimensions and hence the cost of the label supplying apparatus.

The present invention may be modified in the manner described below.

1. The aperture section 23b may be formed at a lateral side of the pseudo metal mold 23 and the label 25 may be placed in position in the hollow section 23a through the lateral side.

Figure 10:
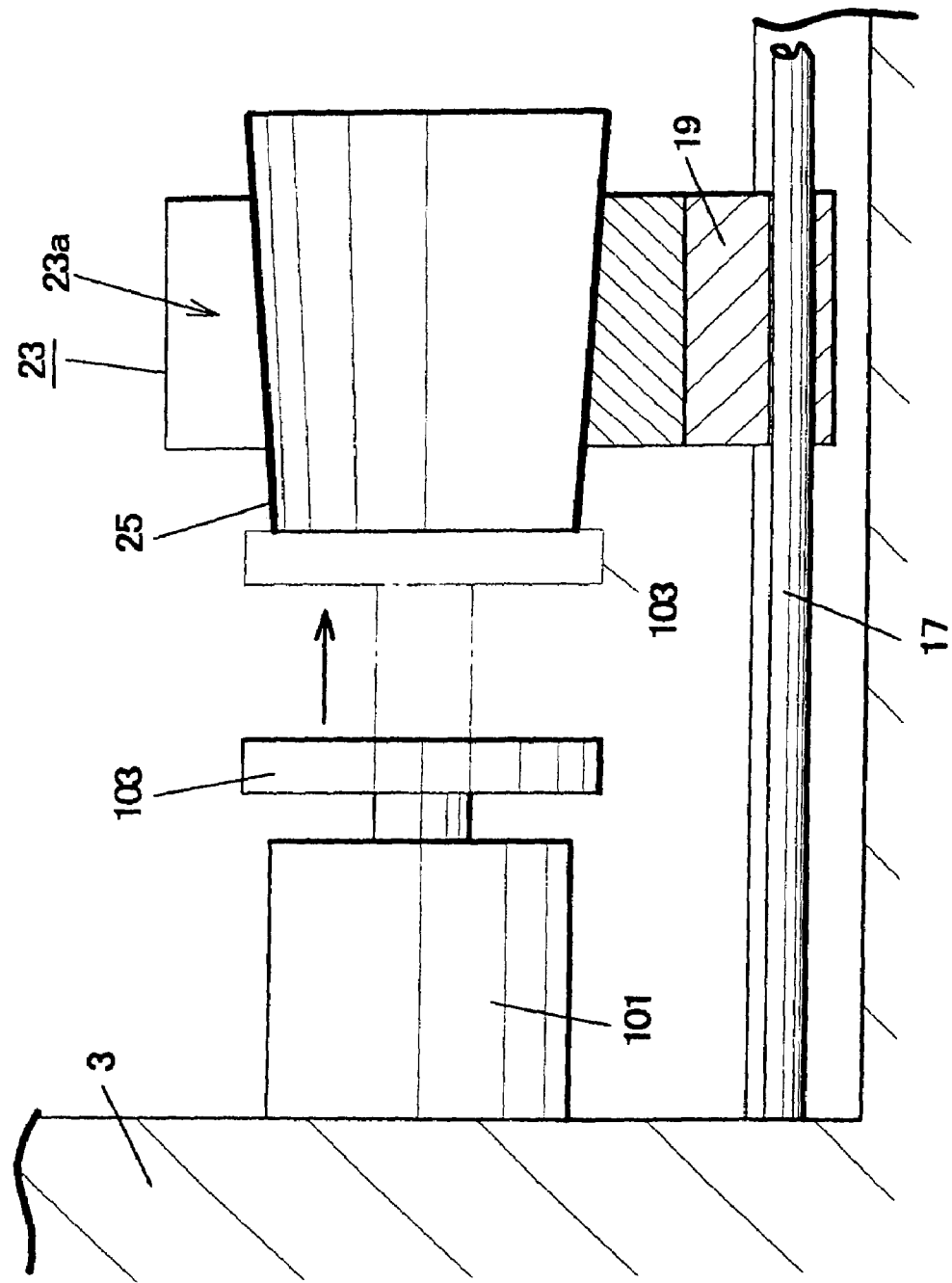
FIG. 10 is a schematic illustration of a modified embodiment of label supplying apparatus according to the invention.

2. A gauge plate 103 linked to an actuator member 101 such as an air cylinder is arranged at the back of the pseudo metal mold 23 as shown in FIG. 10. The actuator member 101 is operated when the label 25 is placed in position in the hollow section 23a of the pseudo metal mold 23 and pressing the gauge plate 103 against the label 25 held in the pseudo metal mold 23 in order to place the label 25 in position in the pseudo metal mold 23.

3. While the pseudo-core is fitted to the chuck plate of a molded product takeout machine in the above description, it may alternatively be so arranged that the pseudo-core is driven to move independently.

4. The pairs of sucking/holding members 15a, 15b, 15c may alternatively be so arranged that their sucking/holding planes are flush with each other. With this arrangement, the label 25 of the uppermost layer may not be reliably separated from the remaining labels of the underlying layers of the group of labels 6 when the label 25 of the uppermost layer is taken out, it may be reliably separated from the labels of the underlying layers of the group of labels 6 when a separating member such as a separator claw or an air jet ejection member is provided.

Figure 11:
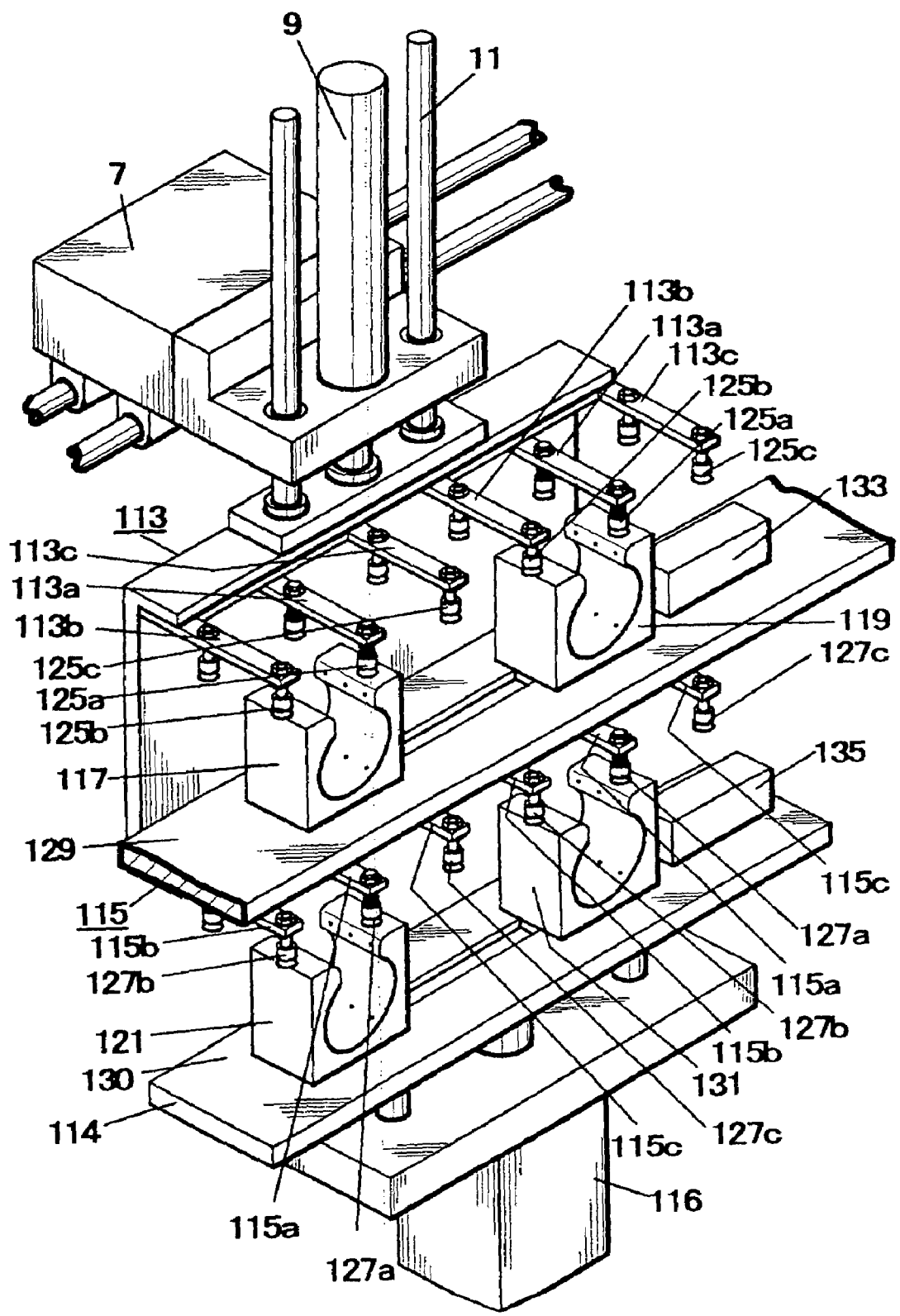
FIG. 11 is a schematic illustration of an embodiment adapted to supply four labels simultaneously.

5. It may alternatively be so arranged that a plurality of labels are supplied at a time as shown in FIG. 11 (four labels are supplied in FIG. 11). More specifically, two anchor plates 113, 115 are rigidly secured to the power shaft 9a and the guide shafts 11 of the lift drive member 9 at respective lower parts thereof and separated from each other by a predetermined vertical distance but linked to each other at a base end thereof. Thus, they are supported by the power shaft 9a and the guide shafts 11 so as to move up and down by a predetermined stroke. A total of six arms 113a, 113b, 113c and 115a, 115b, 115c, which come in two sets of three arms (the arms 113a, 115a being central arms), are arranged under each of the two anchor plates 113, 115 at predetermined intervals. Thus, four sets of three arms extend to respective pseudo metal molds 117, 119, 121, 123, which will be described in greater detail hereinafter. Pairs of front and rear sucking/holding members 125a, 125b, 125c, 127a, 127b, 127c are fitted to the lower surfaces of the front ends of the respective arms 113a, 113b, 113c, 115a, 115b, 115c (the pairs of sucking/holding members 125a, 127a being central pairs).

The lower anchor plate 131 of the two anchor plates 129, 131, which are separated from each other by a predetermined vertical distance, is provided with a vertical shaft that is rigidly secured to a lift member 116 such as a cylinder that is by turn rigidly fitted to a guide shaft 130 and to the main body 3, the guide shaft 130 being rigidly secured to the main body 3. The lower anchor plate 131 is adapted to be driven to move by a lift member 116 between a position located close to the upper anchor plate 129 and a lower position located away from the upper anchor plate 129.

The pseudo metal molds 117, 119 and the pseudo metal molds 121, 123 are fitted respectively to the upper anchor plate 129 and the lower anchor plate 131. Of the pseudo metal molds 117, 119, 121, 123, the pseudo metal molds 117, 121 are horizontally movably supported by the respective anchor plates 129, 131. Thus, the pseudo metal molds 117, 121 are adapted to be driven by respective actuator members 133, 135 such as cylinders that are linked to them so as to come close to and move away from to the other pseudo metal molds 119, 123 that are flush with them respectively. Each of the pseudo metal molds 117, 119, 121, 123 is provided at the rear side thereof with a gauge plate (not shown) that is linked to an actuator member (not shown) such as a cylinder as described above by referring to the first embodiment and held in contact with the label 25 that is supplied to the pseudo metal mold 117, 119, 121 or 123, whichever appropriate, so as to place it in position.

In the case of a metal mold adapted to mold a plurality of labeled and molded products, a plurality of recesses where the labels are placed in position are arranged close to each other. On the other hand, when labels 25 are placed in position in the respective pseudo metal molds 117, 119, 121, 123, the labels 25 are in a spread state and hence each of the pseudo metal molds 117, 119, 121, 123 needs to be separated from the adjacently located pseudo metal mold by a distance greater than the longitudinal width of the labels 25. Thus, after labels 25 are supplied to the pseudo metal molds 117, 119, 121, 123, each of the pseudo metal molds 117, 119, 121, 123 has to be separated from the adjacently located pseudo metal mold by a distance that is equal to the distance separating the recesses of the metal molds.

Figure 12:
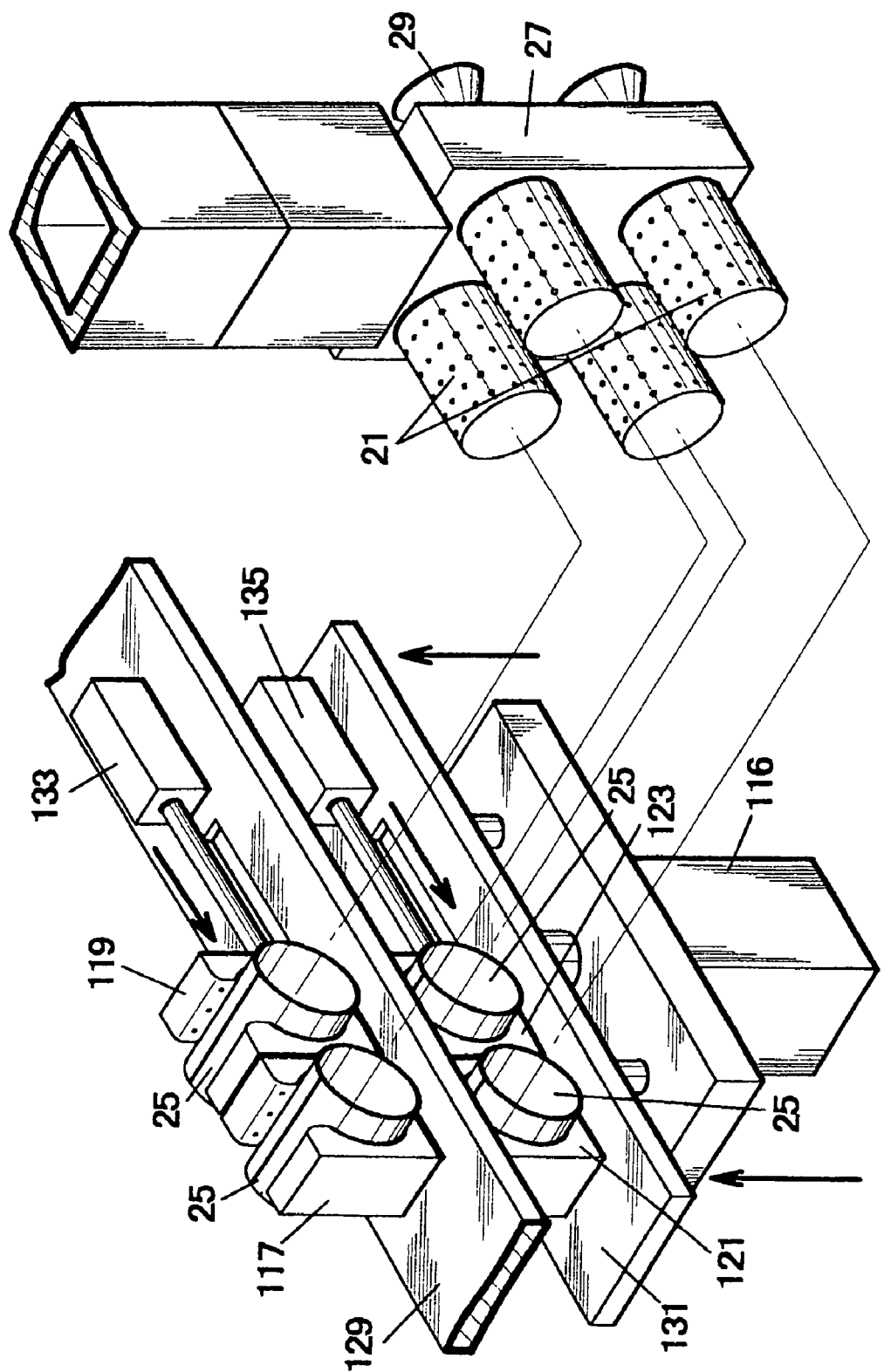
FIG. 12 is a schematic illustration of a state of a traveling pseudo metal mold.
Figure 13:
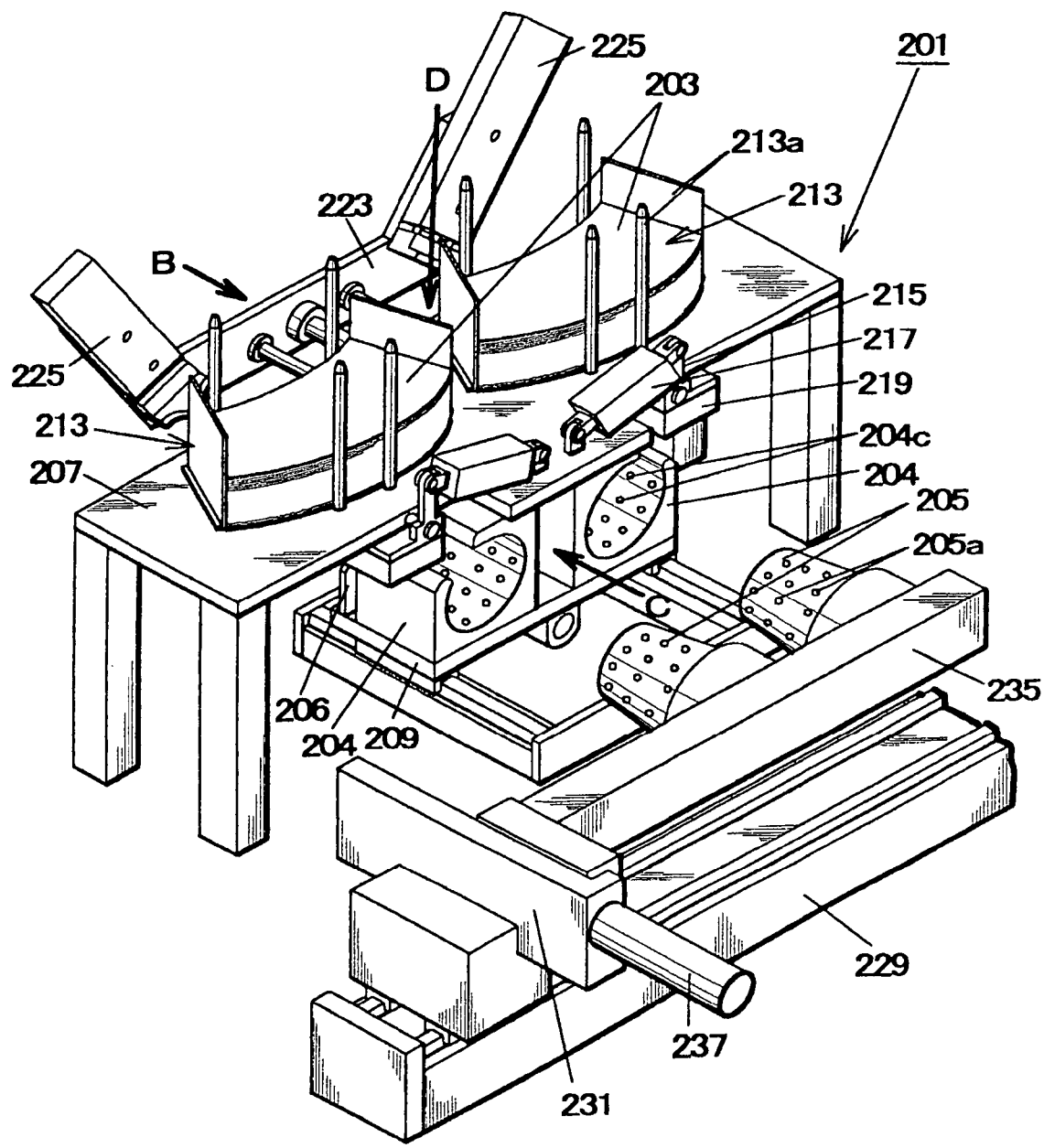
FIG. 13 is a schematic perspective view of a label supplying apparatus.
Figure 14:
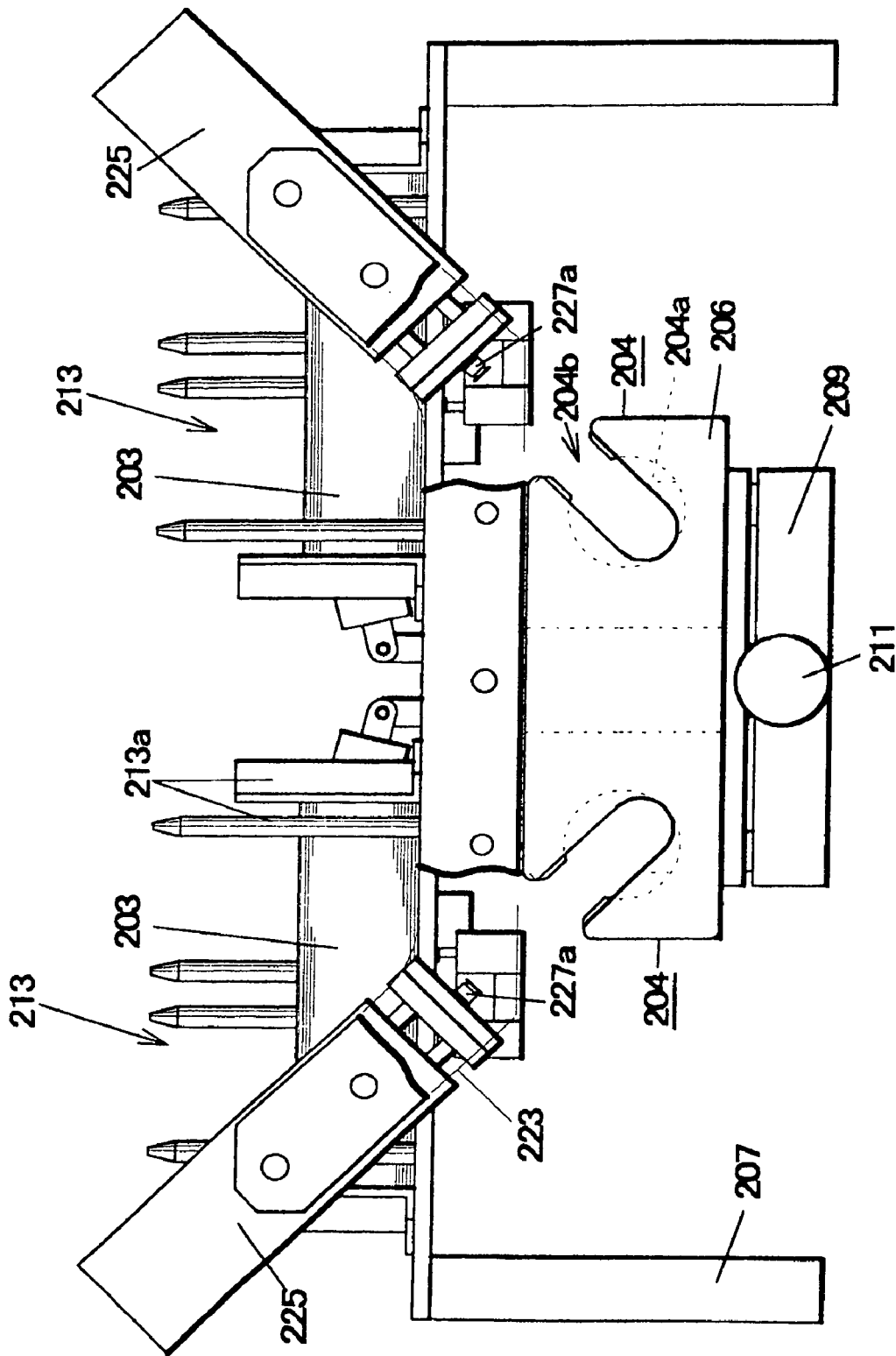
FIG. 14 is a side view of the apparatus shown in FIG. 13 as seen from the direction of an arrow B, except for a pseudo-core portion.
Figure 15:
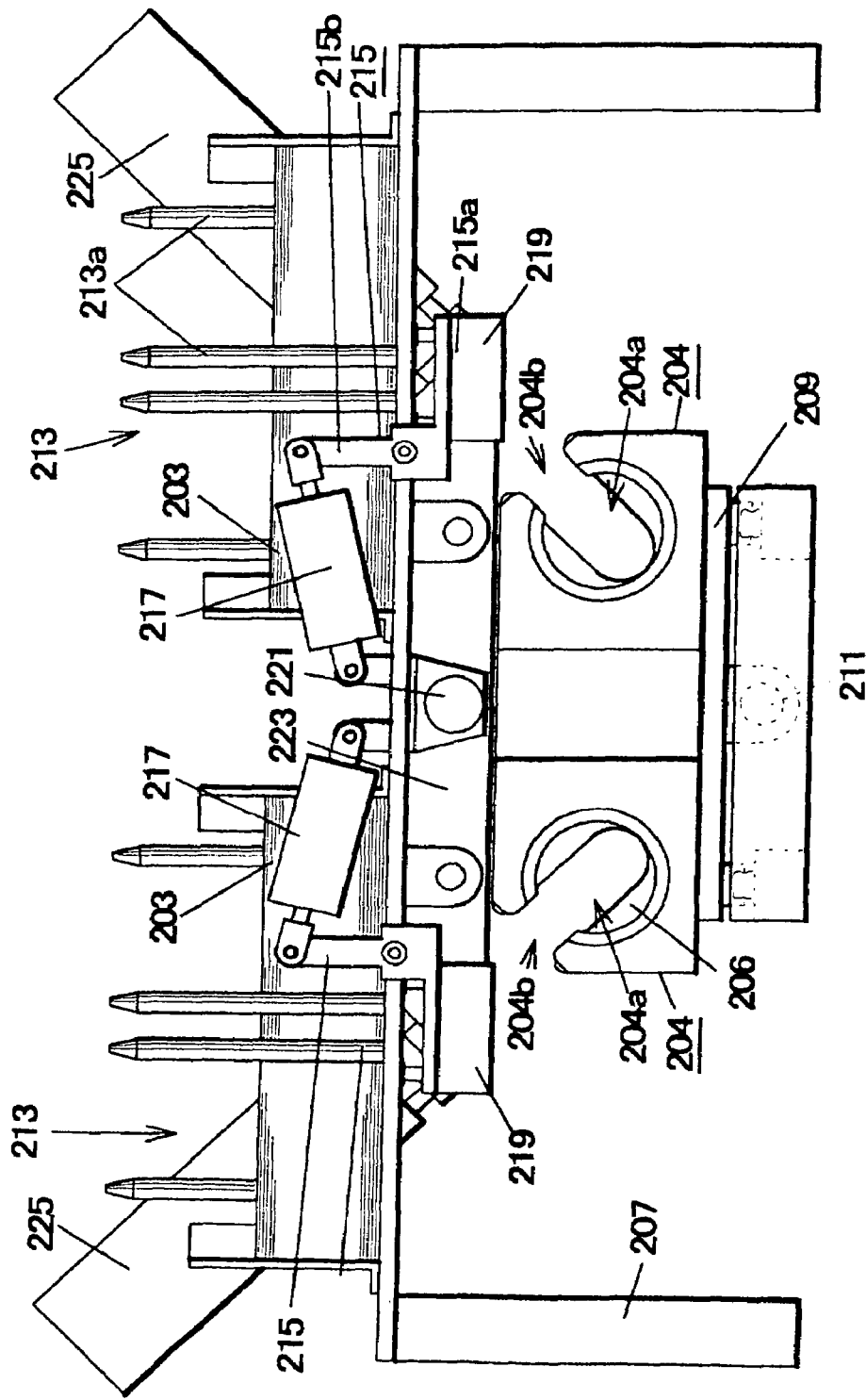
FIG. 15 is a side view of the apparatus shown in FIG. 13 as seen from the direction of an arrow C, except for a pseudo-core portion.
Figure 16:
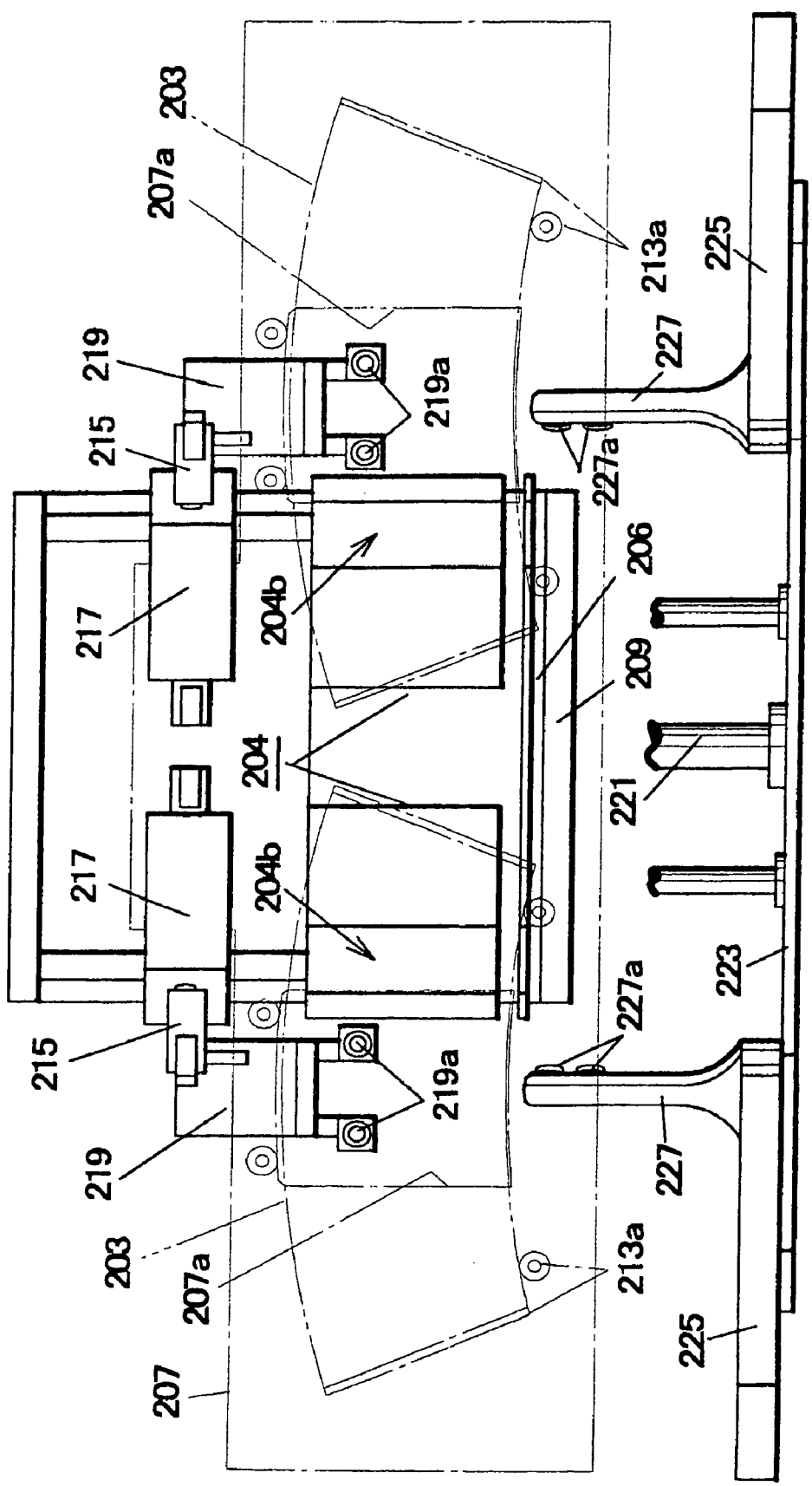
FIG. 16 is a side view of the apparatus shown in FIG. 13 as seen from the direction of an arrow D, except for a pseudo-core portion.

In the modified embodiment illustrated in FIG. 11, after labels 25 are supplied to the respective pseudo metal molds 117, 119, 121, 123, the lift member 116 is operated in a state where each of the anchor plates 113, 115 is separated from the corresponding ones of the pseudo metal molds 117, 119, 121, 123. Then, the lower anchor plate 131 is driven to move upward and the actuator members 133, 135 are operated to drive the pseudo metal molds 119, 123 to respectively come close to the other pseudo metal molds 117, 121 so as to put the pseudo metal molds 117, 119, 121, 123 close to each other to make the distance separating the horizontally adjacently located pseudo metal molds equal to the distance separating the recesses of the metal molds (see FIG. 12).

The operation of receiving a label 25 of each of the pseudo metal molds 117, 119, 121, 123, that of using each of the gauge plate, and that of supplying a label 25 to each of the pseudo-cores 21 are the same as those described by referring to the first embodiment and hence will not be described here any further. Additionally, the components same as those of the first embodiment are denoted respectively by the same reference symbols and their descriptions will be omitted.

Second Embodiment

When supplying the labels 25 held by the respective pseudo metal molds 23 to the corresponding pseudo-cores 21 simultaneously, the pseudo-cores 21 have to be located close to each other, taking the intervals separating the corresponding cavities of the metal molds into consideration. For this reason, in the modified embodiment illustrated in FIG. 11, the pseudo metal molds 23 are separated from each other by a relatively large distance when labels 25 are placed in position in the respective pseudo metal molds 23 but brought close to each other so as to make the distance separating the adjacently located pseudo metal molds 23 equal to the distance separating the cavities of the corresponding metal molds when supplying the labels 25 in the pseudo metal molds 23 to the respective pseudo-cores. Thus, the embodiment of label supplying apparatus requires the use of a drive mechanism for bringing the pseudo metal molds 23 close to each other. In other words, the apparatus is structurally complex and it takes a long time for the label supplying operation.

This embodiment of label supplying apparatus 201 is designed to dissolve the above-identified problem. Now, the label supplying apparatus 201 will be described by referring to the related drawings.

Referring to FIGS. 13 through 16, the label supplying apparatus 201 is designed to deliver two labels 203 respectively to two pseudo-cores 205 simultaneously at a time. A movable body 209 is supported by main body frame 207 of the label supplying apparatus 201 so as to be movable in the direction of the axial line of the pseudo metal mold 204. The movable body 209 is driven to reciprocate by an actuator member 211 such as an air cylinder that is rigidly secured to the main body frame 207.

Figure 25:
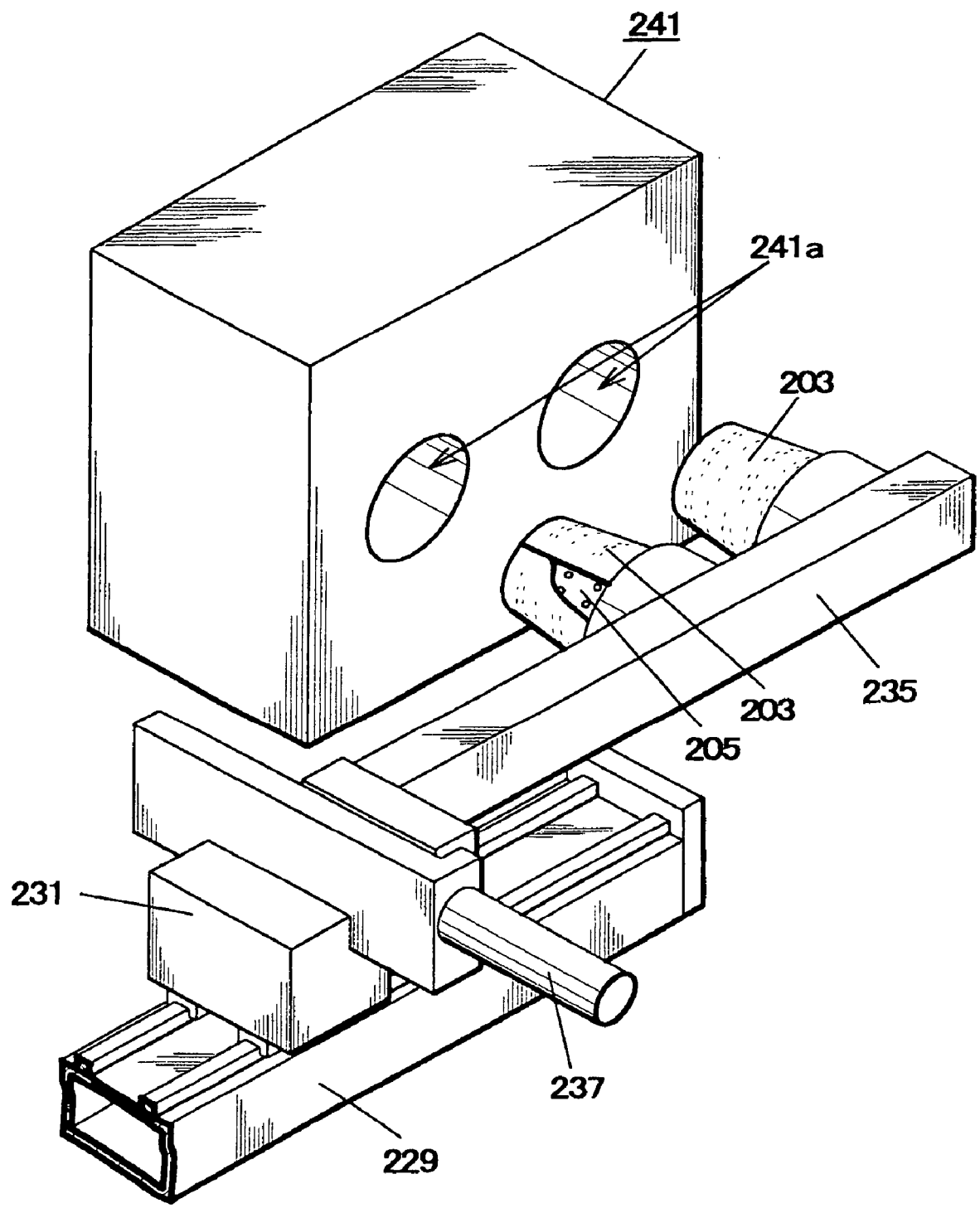
FIG. 25 is a schematic illustration of a state where the metal mold faces the pseudo-core.
Figure 26:
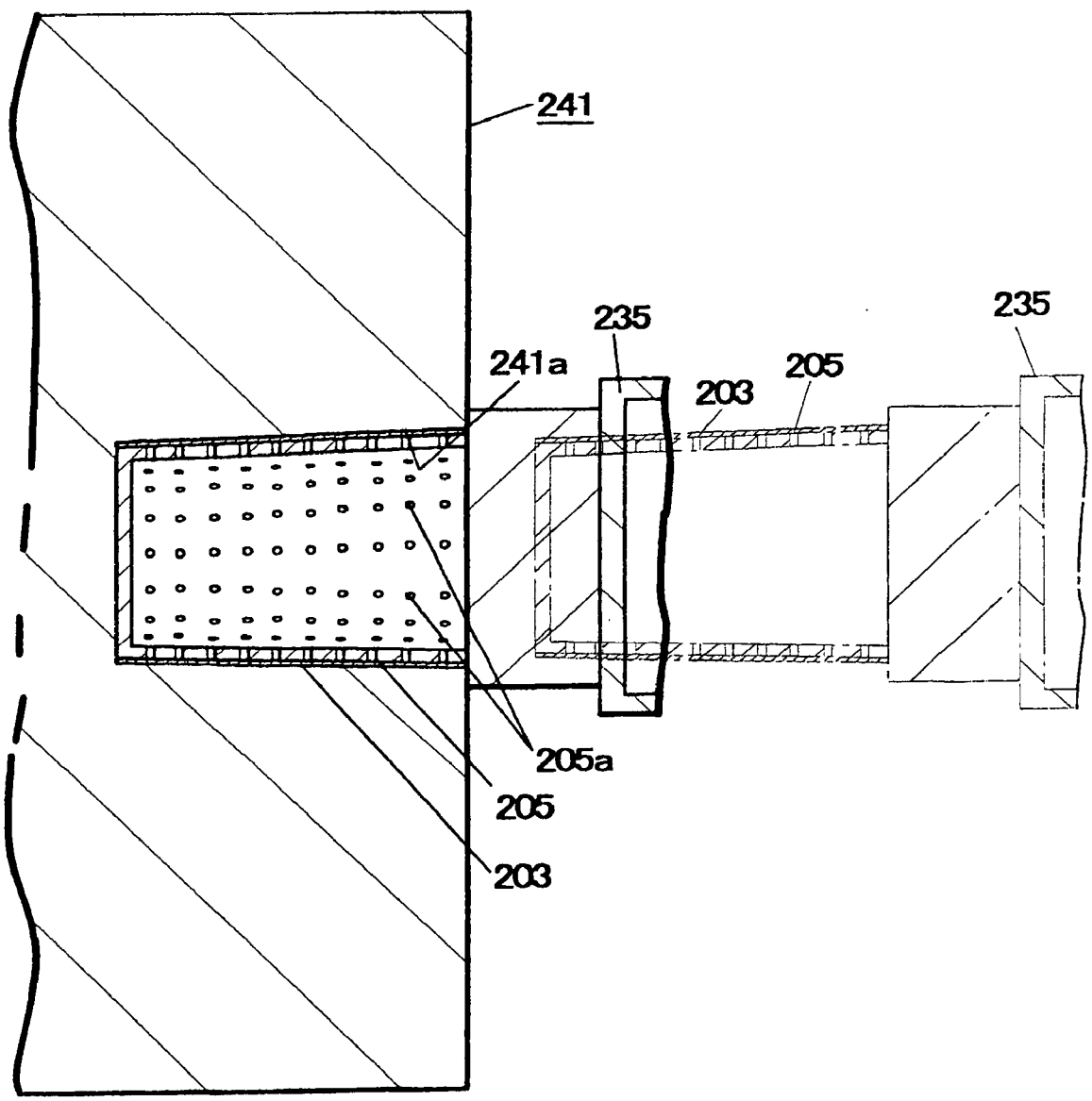
FIG. 26 is a schematic illustration of a state where the pseudo-core is driven into a cavity.

Two pseudo metal molds 204 are arranged adjacently relative to each other on the movable body 209 with their axial lines running in parallel with each other. The pseudo metal molds 204 are separated from each other by a distance equal to the distance separating the plurality of (two) cavities 241a (as shown in FIGS. 25 and 26) formed in the metal mold 241 from each other and secured in position. Thus, the pseudo metal molds 204 are arranged transversally symmetrically. Each of the pseudo metal molds 204 has in the inside thereof a hollow section 204a that shows a profile of a frustum of circular cone, a cylinder, a prism or some other form and at an upper lateral corner thereof an introducing aperture section 204b that is in communication with the inside of the hollow section 204a. Additionally, each of the pseudo metal molds 204 is provided on the inner surface of the hollow section 204a thereof with a large number of suction pores 204c connected to a negative pressure (vacuum) generating apparatus (not shown) so that the label 203 that is introduced into the hollow section 204a is drawn by the negative pressure and tightly adheres to the inner surface of the hollow section 204a.

A gauge plate 206 is arranged at the back of the movable body 209 (at the side opposite to the pseudo-cores 205) and adapted to contact the rear edges of the labels held in the hollow sections 204a of the pseudo metal molds 204 so as to place the labels 203 in position.

Label stock sections 213 are arranged on the main body frame 207 at positions above the respective pseudo metal molds 204. The main body frame 207 is provided with apertures 207a, each having a width running in the back and forth direction slightly larger than the width of a label 203 as viewed in a direction perpendicular to the longitudinal direction thereof and a width running in the transversal direction slightly smaller than the width of the longitudinal width of the label 203 so as to allow the label 203 through it. A plurality of guide members 213a is standing from the lateral edges of the apertures 207a. A large number labels 203 are stacked on the top surface of the main body frame 207 in two areas defined by the guide members 213a. The label 203 of the lowermost layer of the labels 203 of each of the stacks is taken out through the corresponding one of the apertures 207a.

Two swing arms 215 are supported by the main body frame 207 so as to be able to swing and located above the respective pseudo metal molds 204. Each of the swing arms 215 includes a first arm section 215a having a length that allows it to extend to a middle part of the corresponding aperture 207a as viewed in a horizontal direction and a second arm section 215b standing upward. The second arm sections 215b are linked to respective swinging members 217 such as air cylinders that are rigidly secured to the main body frame 207. A sucking/holding member 219 is fitted to the front end of each of the first arm sections 215a. The sucking/holding member 219 has a pair of sucking disks 219a for sucking the label 203 of the lowermost layer of the stack of labels in the corresponding label stock section 213 and taking it out. The sucking/holding members 219 are separated from each other by an appropriate distance as viewed in the longitudinal direction and adapted to come close to and move away from each other. As pointed out above, each of the sucking/holding members 219 is adapted to pick and bring out the label 203 of the lower most layer of the stack of labels in the corresponding label stock section 213. Additionally, each of the sucking/holding members 219 is adapted to swing between a position where it can suck and hold the lower surface of the label of the lowermost layer of the stack of labels in the corresponding label stock section 213 and a position close to the introducing aperture section 204b of the corresponding pseudo metal mold 204 as it is driven by the corresponding swinging member 217.

A horizontal actuator member 221 such as an air cylinder is fitted to the main body frame 207 at a position between the two pseudo metal molds 204. An anchor plate 223 having a length between the opposite ends thereof that extends between the outer ends of the pseudo metal molds 204 is fitted to the actuating shaft of the horizontal actuator member 221. Pushing actuator members 225 that operate as respective parts of pushing members are fitted to the opposite ends of the anchor plate 223. Each of the pushing actuator members 225 is inclined in such a way that its axial line agrees with an imaginary straight line that connects the center and the introducing aperture section 204b of the corresponding pseudo metal mold 204. A pushing arm 227 is rigidly secured to the front end of the actuating shaft of each of the pushing actuator members 225 in such a way that it extends in the axial direction of the corresponding pseudo metal mold 204 so that it can be introduced into the introducing aperture section 204b of the corresponding pseudo metal mold 204. The pushing arms 227 operate as respective parts of the pushing members having sucking disks 227a on the pushing surfaces thereof that are adapted to press the corresponding respective labels 203.

A traveling frame 229 is arranged at the front side of the pseudo metal molds 204 so as to extend in a direction perpendicular to the axial lines of the pseudo metal molds 204 and toward a side of the metal mold 241 of the resin molding machine. A traveling body 231 is supported by the traveling frame 229 so as to be able to reciprocate. The traveling body 231 is driven to reciprocate by a known reciprocation drive mechanism such as a feed screw drive mechanism engaged with a feed screw (not shown) that is linked to an electric motor (not shown) such as a numerically controllable servo motor to rotate or a belt drive mechanism linked to an electric motor and having a timing belt (not shown) that is partly rigidly secured to the traveling body 231.

The anchor frame 235 is driven to reciprocate in the direction of the axial lines of the pseudo metal molds 204 by a back and forth moving actuator member 237 such as an air cylinder rigidly secured to the traveling body 231. The anchor frame 235 has such a horizontal length that it can move the pseudo-cores 205, which will be described in greater detail hereinafter, to respective positions that are located in front of the corresponding cavities when the traveling body 231 is moved to the side of the metal mold 241 along the traveling frame 229.

Two pseudo-cores 205 are fitted to the anchor frame 235 respectively at positions vis-à-vis the corresponding pseudo metal molds 204. Each of the pseudo-cores 205 has a profile that allows it to be put into the hollow section 204a of the corresponding pseudo metal mold 204 located in front of it and is provided on the outer surface thereof with a large number of suction pores 205a that are connected to a negative pressure (vacuum) generating apparatus. Each of the pseudo-cores 205 is driven to reciprocate between an engaged position where it is put into and engaged with the hollow section 204a of the corresponding pseudo metal mold 204 and a separated position where it is drawn out from the inside of the hollow section 204a as the back and forth moving actuator member 237 is operated.

Now, the method and the effect of supplying labels 25 to the pseudo-cores 205 by the label supplying apparatus 201 will be discussed below.

Figure 17:
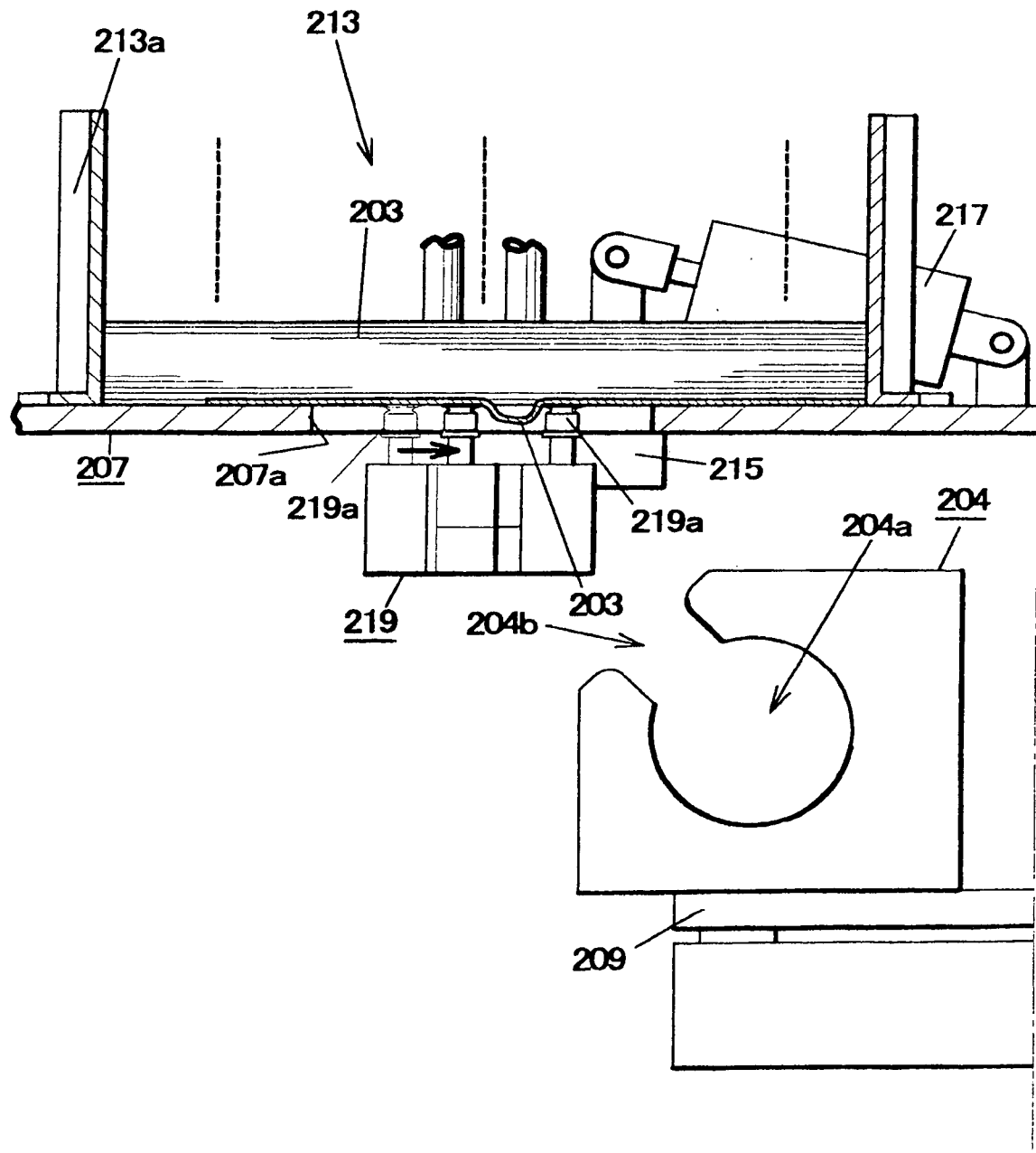
FIG. 17 is a schematic illustration showing a suction state of the label of the lower most layer in the label stock section.
Figure 18:
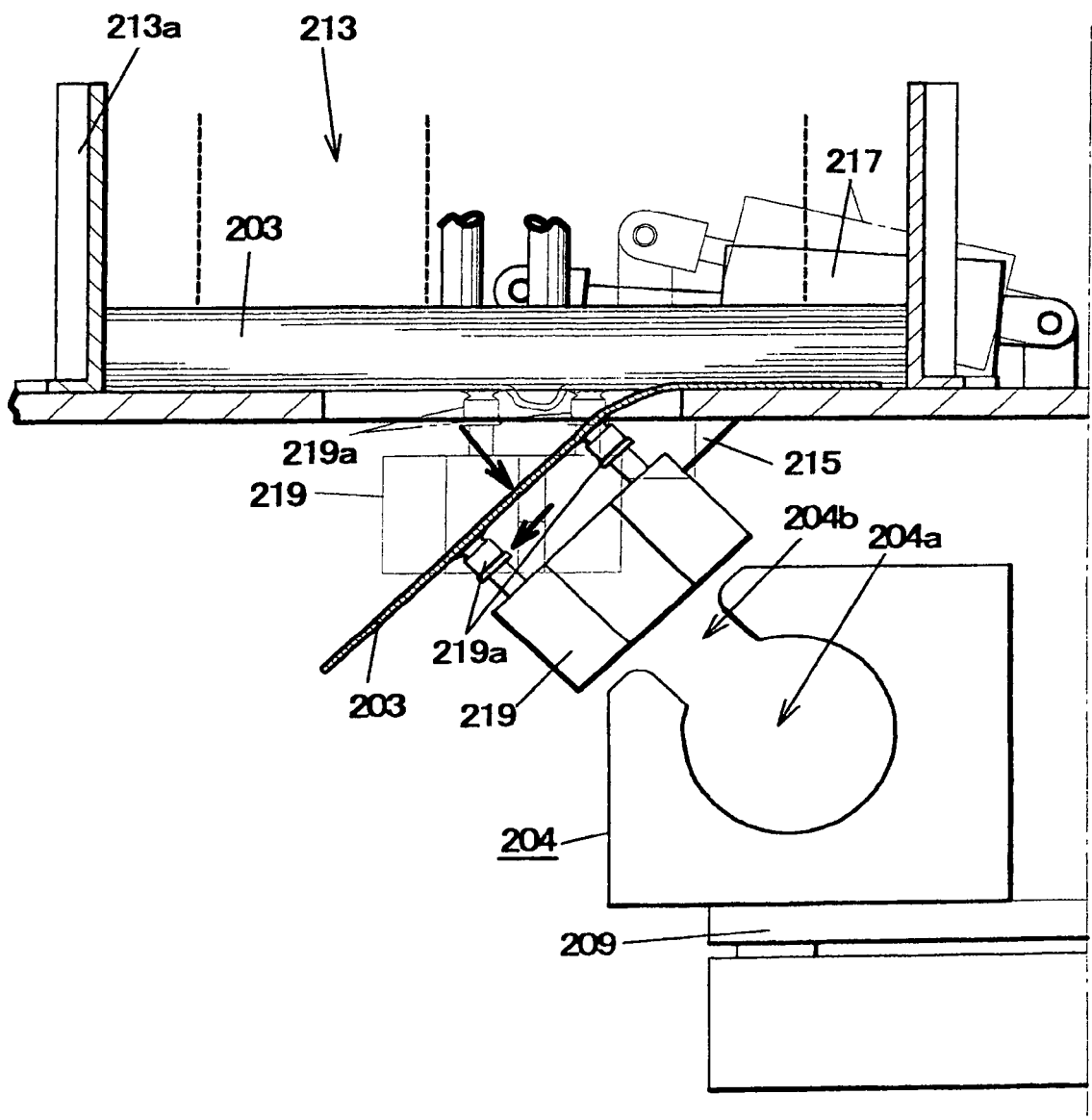
FIG. 18 is a schematic illustration of a state where the label is driven to swing and move to the side of an introducing aperture section.

Firstly, each of the sucking/holding members 219 is driven to swing and move to the lower surfaces of the labels 203 of the lowermost layers of the stacks of labels stacked in the corresponding label stock section 213 so as to suck and hold the label 203 at the lower surface thereof in a state where the corresponding pseudo-cores 205 are separated from the respective pseudo metal molds 204. At this time, as shown in FIG. 17, the paired two sucking disks 219a of each of the sucking/holding members 219 that suck and hold the label 203 at the lower surface thereof are moved to come close to each other and pick and bring out part of the sucked label 203 through the corresponding aperture section 207a. Then, the corresponding swinging member 217 is operated to drive the corresponding swing arm 215 to swing and move to the side of the introducing aperture section 204b of the corresponding pseudo metal mold 204 under this condition and the label 203 that is sucked and held by the sucking/holding member 219 is partly drawn out through the aperture section 207a and moved to the introducing aperture section 204b located at a lateral side of the corresponding pseudo metal mold 204 as shown in FIG. 18.

Note that, while each of the sucking/holding members 219 is swinging and moving, the pair of sucking disks 219a that are sucking and holding the label 203 are moved away from each other to make the label 203 flat.

Figure 19:
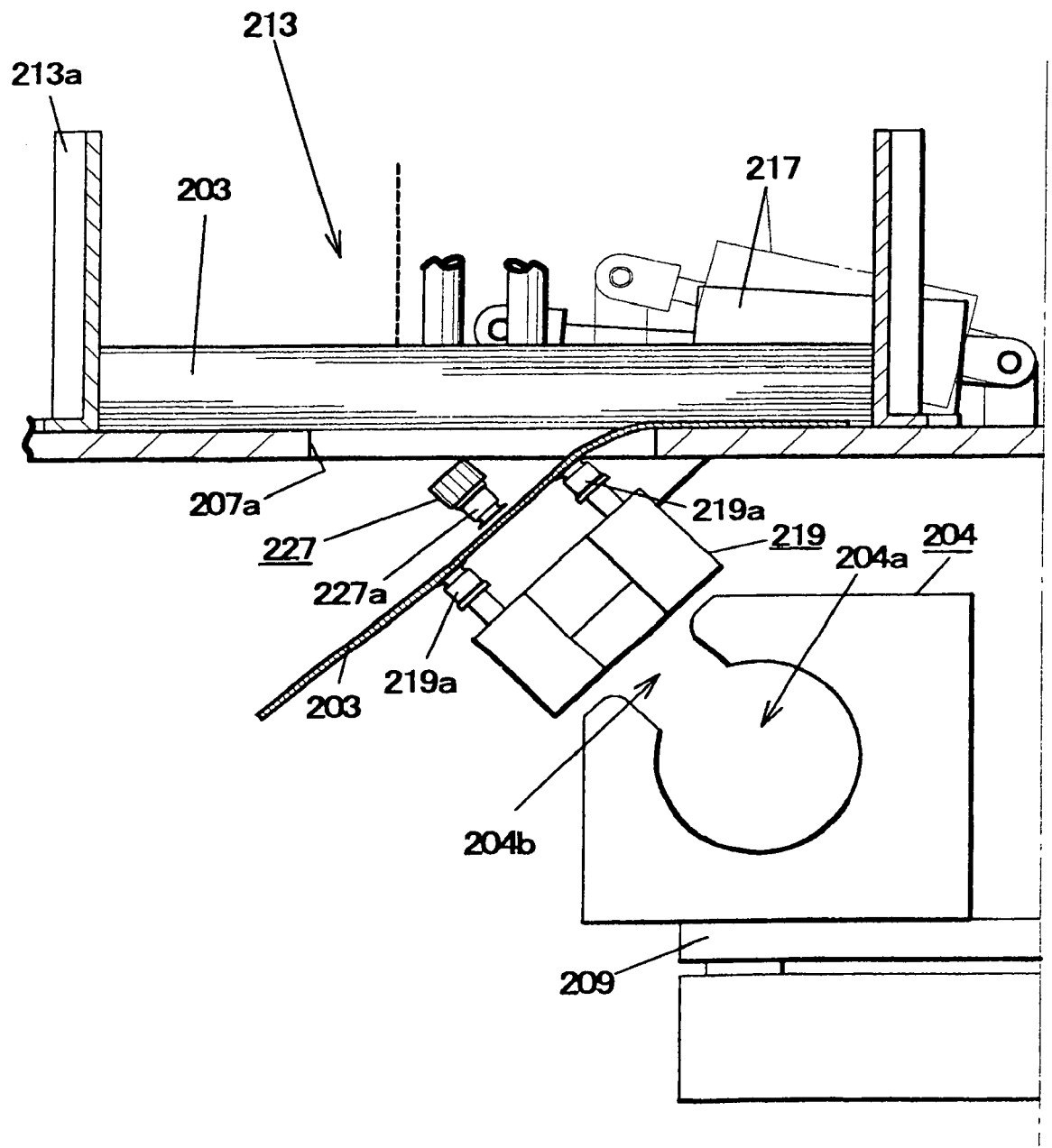
FIG. 19 is a schematic illustration of a state of the label and a pushing arm.
Figure 20:
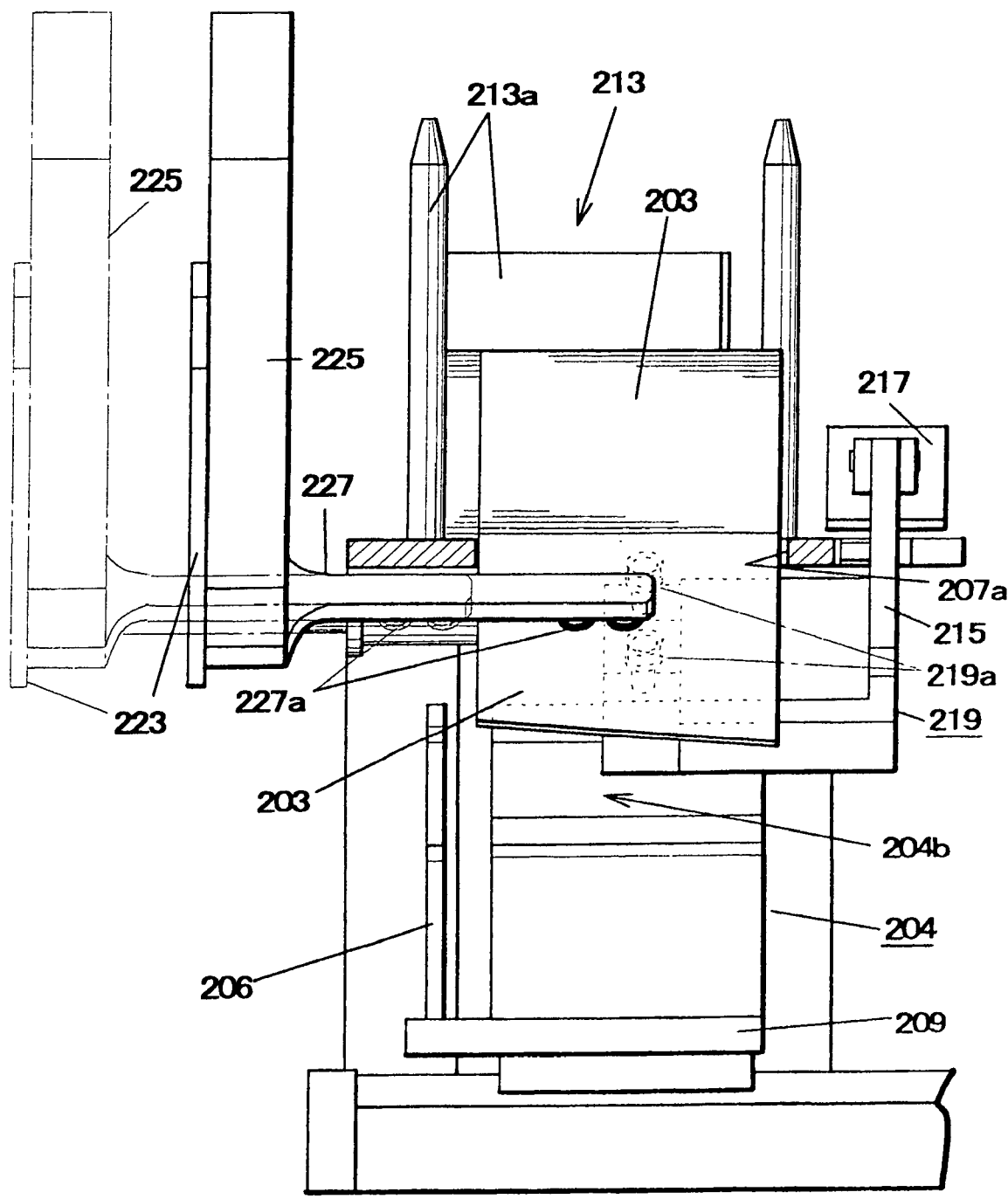
FIG. 20 is a schematic illustration of a state of the traveling pushing arm.

Then, as shown in FIGS. 19 and 20, the horizontal actuator member 221 is operated to move each of the pushing arms 227 that have been moved to respective non-interfering positions relative to the moving labels 203 so as to make it face the surface of the corresponding label 203 at the side opposite to the sucked surface between the pair of sucking disks 219a. At this time, each of the labels 203 sucked and held by the respective sucking/holding members 219 is partly sucked and held by the sucking disk 227a of the pushing arm 227.

Figure 21:
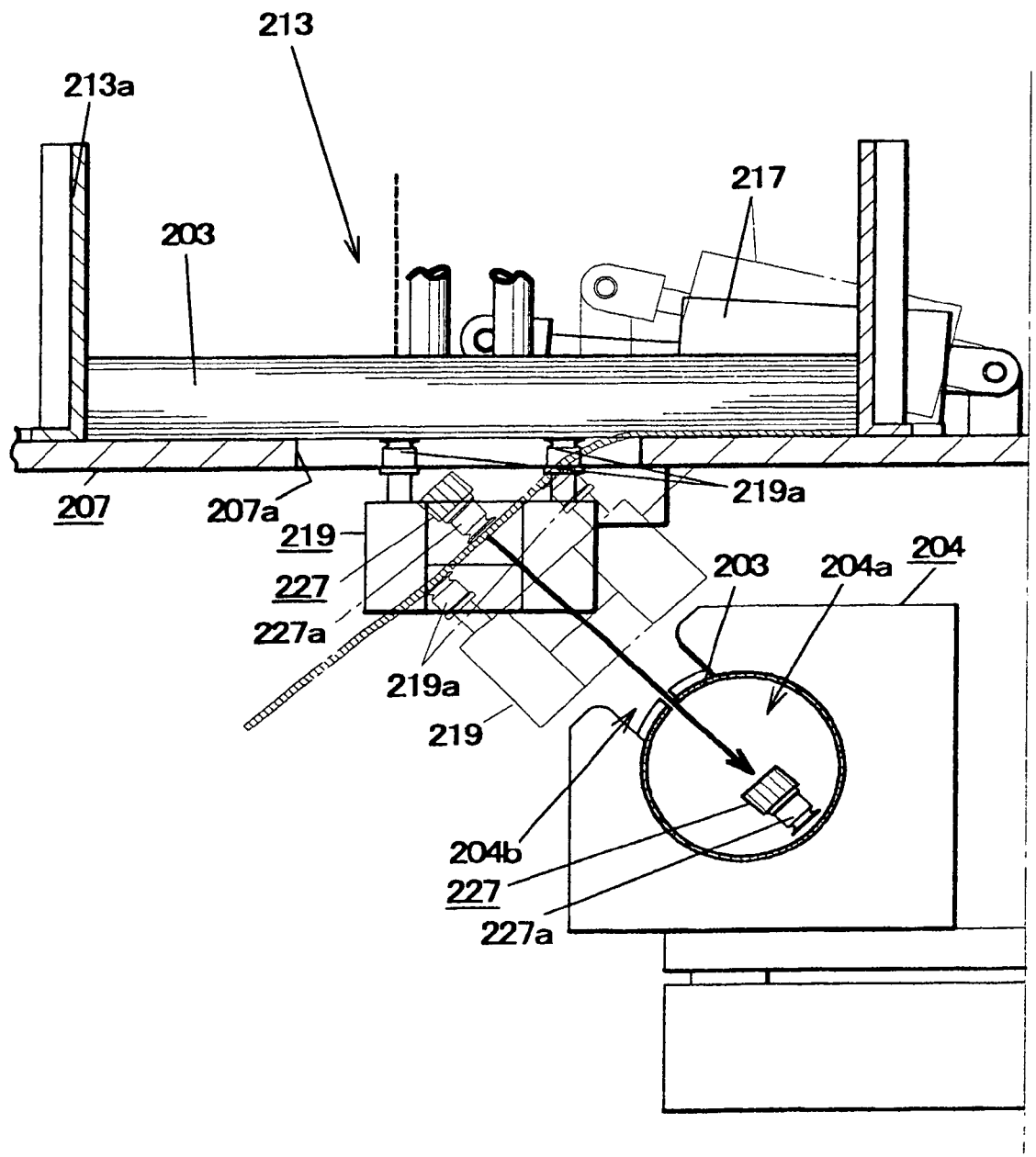
FIG. 21 is a schematic illustration of a state where the label is pushed into the pseudo metal mold.

Then, as shown in FIG. 21, each of the pushing actuator members 225 is operated to bring the corresponding pushing arm 227 into the hollow section 204a of the pseudo metal mold 204 through the introducing aperture section 204b at a timing substantially synchronized with the timing of releasing the corresponding label 203 from the state of being sucked and held by the sucking/holding member 219. Thus, the label 203 that is sucked and held by the sucking disk 227a is pushed into the hollow section 204a while it is being resiliently deformed. As a result, the label 203 that is pushed into the hollow section 204a is sucked and held to the entire inner surface of the hollow section 204a by the negative pressure applied thereto by way of the suction pores 204c, while it is restoring its original posture by its resiliency. In synchronism with the operation of the pushing actuator member 225, the swing member 217 is moved back to by turn move the sucking/holding member 219 to the lower surface of the label 203 to be supplied next of the lowermost layer of the stack of labels stacked in the label stock section 213 and cause it to suck and hold the label 203.

Figure 22:
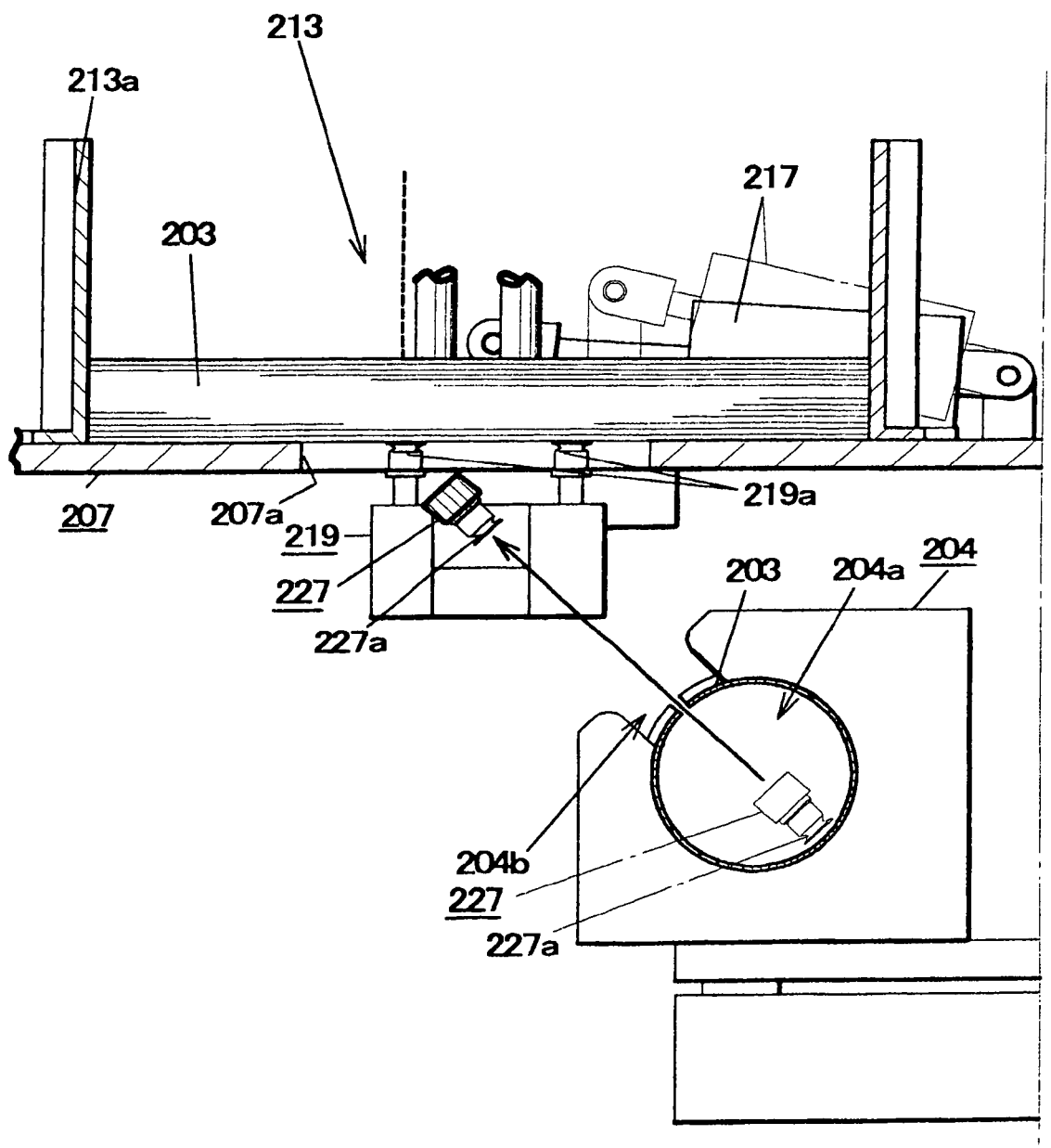
FIG. 22 is a schematic illustration of a state where the label is placed in position in the pseudo metal mold.

After the above operation, as shown in FIG. 22, the pushing actuator member 225 is moved back so as to drive the pushing arm 227 to go out of the pseudo metal mold 204 that is no longer sucking and holding the label 203 by means of the sucking disk 227a. Then, the horizontal actuator member 221 is moved back to bring the pushing arms 227 back to the original positions separated from the respective pseudo metal molds 204.

Figure 23:
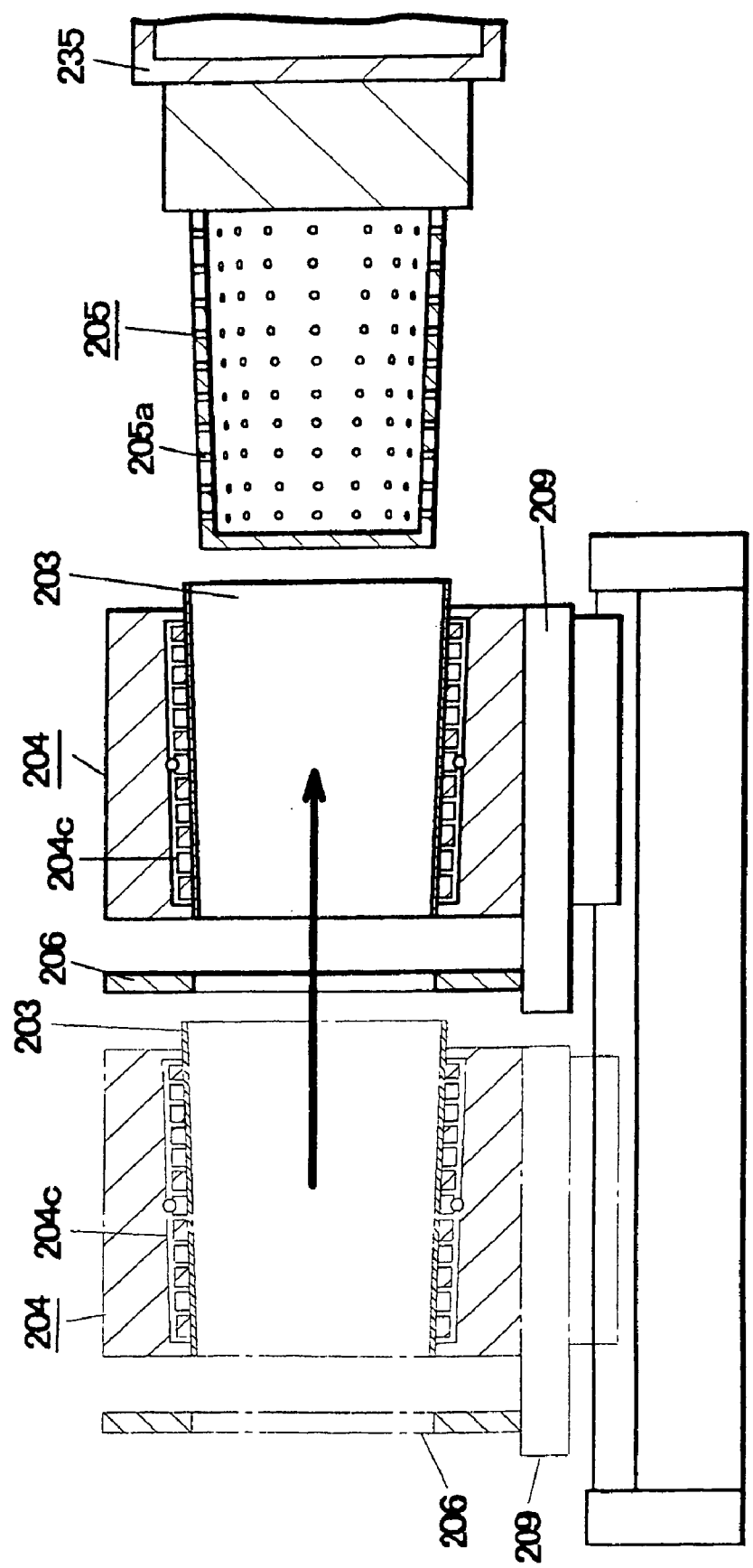
FIG. 23 is a schematic illustration of a state of the traveling pseudo-core and pseudo metal mold.
Figure 24:
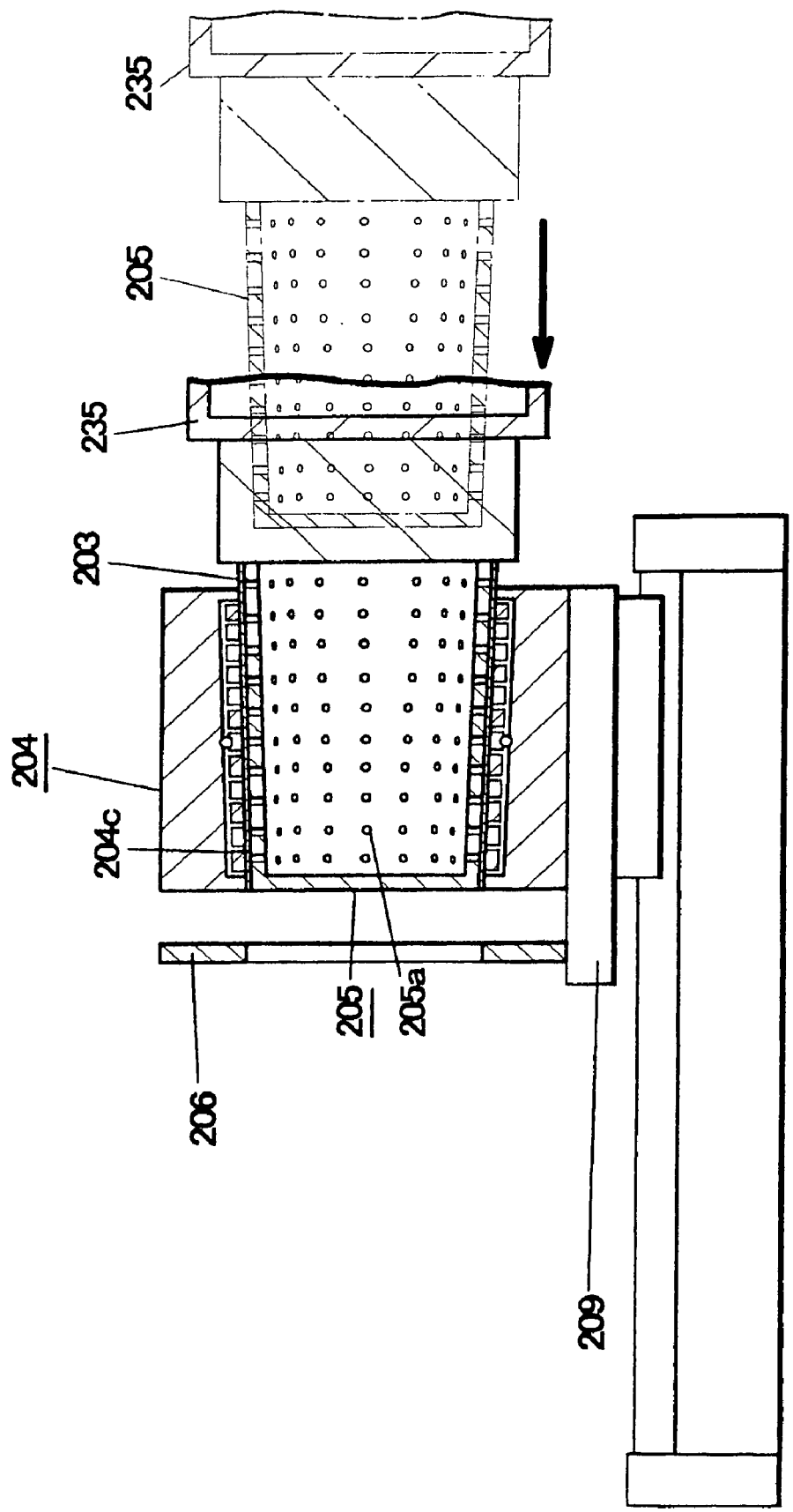
FIG. 24 is a schematic illustration of a state where the label is supplied to the pseudo-core.

After the above operation, as shown in FIG. 23, the actuator member 221 is operated to move each of the pseudo metal molds 204 that are sucking and holding the respective labels 203 in the corresponding hollow sections 204a toward the corresponding pseudo-core 205. Then, as shown in FIG. 24, the back and forth moving actuator member 237 is operated to drive the pseudo-cores 205 to move toward the respective pseudo metal molds 204 and then into the respective hollow section 204a for engagement. The labels 203 are released from the state of being sucked by the suction pores 204c under this condition and, at the same time, become sucked to and wound around the entire outer surfaces of the respective pseudo-cores 205 by negative pressure applied to them by way of the suction pores 205a of the pseudo-cores 205.

Then, the back and forth moving actuator member 237 is moved back to bring the pseudo-cores 205, which are now sucking and holding the respective labels 203 that are wound around the entire outer surfaces thereof, to the respective original positions. Thus, the labels 203 are supplied from the pseudo metal molds 204 to the pseudo-cores 205.

Then, the pseudo-cores 205, which are now sucking and holding the respective labels 203 that are wound around the entire outer surfaces thereof, are driven to move to the side of the metal mold 241 and face the respective cavities 241a. Then, the back and forth moving actuator member 237 is operated to drive the pseudo-cores 205 to move into the respective cavities 241a and release the labels 203 from the state of being sucked by the suction pores 205a in order to allow them to be placed in the respective cavities 241a (see FIGS. 25 and 26).

Thereafter, the back and forth moving actuator member 237 is moved back to by turn drive the pseudo-cores 205 to go out of the cavities 241a of the metal mold 241 and the electric motor is operated to bring the pseudo-cores 205 to the original positions and end the operation of placing the labels 203 in the metal mold 241 (see FIG. 26).

Thus, as described above, this embodiment is adapted to bring at least two pseudo metal molds 204 close to each other so as to make their positional arrangement agree with that of the cavities 241a of the metal mold 241 by bringing labels 203 into the hollow sections 204a of the respective pseudo metal molds 204 from lateral sides thereof so as to have the pseudo metal molds 204 play the role of winding the labels 203 around the entire outer surfaces of the respective pseudo-cores 205. As a result, it is not necessary to provide a mechanism for driving the pseudo metal molds in a horizontal direction unlike the embodiment of this invention illustrated in FIGS. 11 and 12. Thus, it is possible to further reduce the overall dimensions of the label supplying apparatus.

Figure 27:
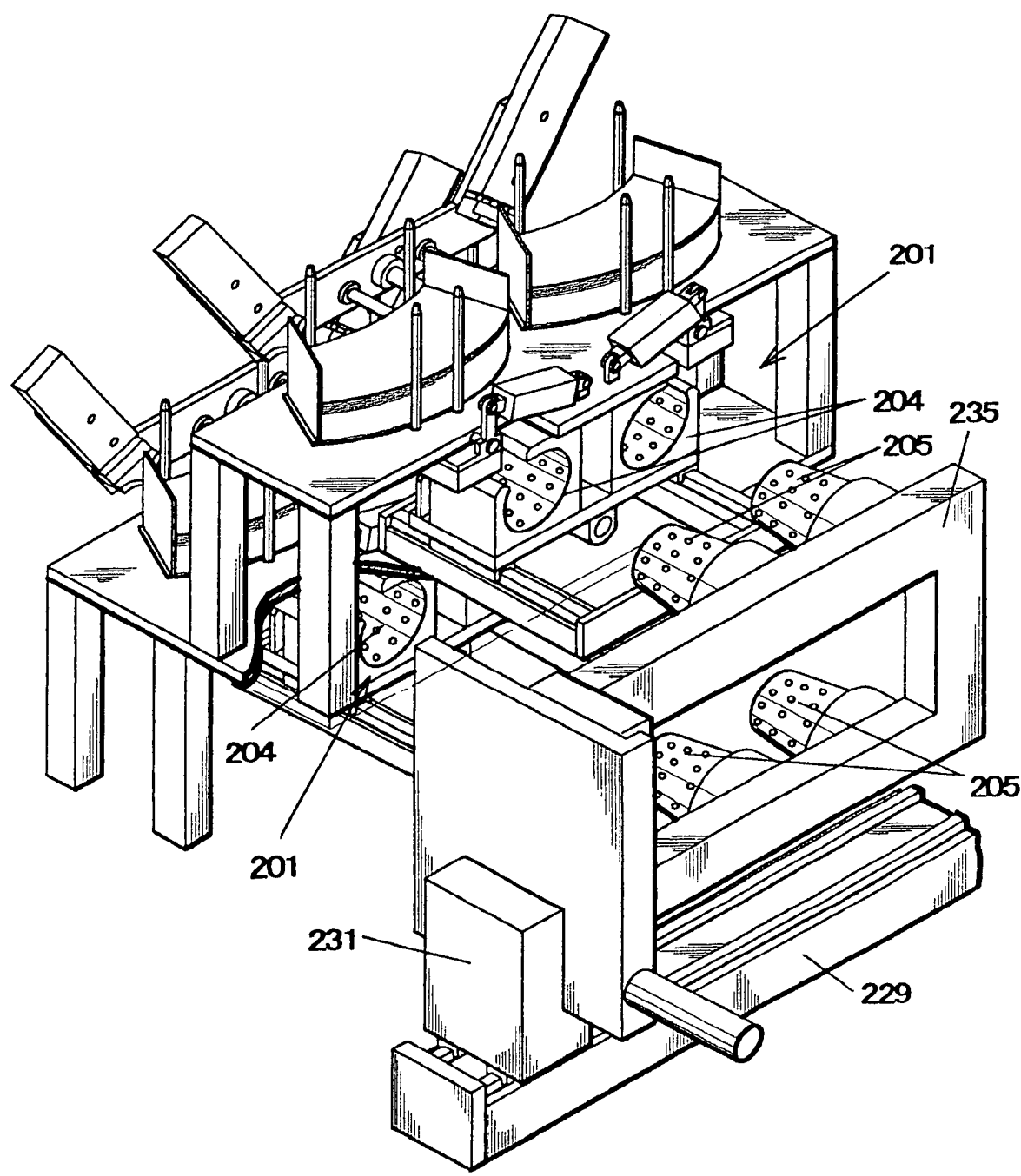
FIG. 27 is a schematic illustration of an application of the second embodiment.

While an apparatus and a method adapted to arrange two pseudo metal molds 204 at positions close to each other on a movable body and deliver two labels 203 respectively to two pseudo-cores 205 with the labels 203 wound around them is described above, the present invention is applicable to a metal molds having four or more than four cavities. In the case of a metal mold having four cavities, a label supplying apparatus 201 according to the invention comprises two pairs of pseudo metal molds 204 arranged at different respective levels so as to prevent them from interfering with each other as shown in FIG. 27. Then, it is possible to deliver four labels at a time. The number of pairs of pseudo metal molds and hence the levels of arrangement of the pairs may be increased in this way.

While the introducing aperture sections 204b are formed respectively at upper lateral corners of the pseudo metal molds 204 and labels 203 are brought into the respective hollow sections 204a from the lateral sides of the pseudo metal molds 204 that are remote from each other so that the sucking/holding members 219 may not interfere with each other in the above description, the positional arrangement of the introducing aperture sections of the pseudo metal molds is not limited to the above description. For example, introducing aperture sections may be formed at lateral sides of the pseudo metal molds that are arranged close to each other and the sucking/holding members for holding labels may be brought into the hollow sections of the respective pseudo metal molds by way of the introducing apparatus sections in a state where they do not interfere with each other.

What is claimed is:

1. An apparatus for supplying a label to a pseudo-core used for label insert molding wherein a label wound around an outer peripheral surface of the pseudo-core is mounted in a metal mold and a molded product in which the label is integrated is molded by injecting synthetic resin into the metal mold, the apparatus comprising:

a holding member including a sucking/holding member that sucks and holds a label from a group of labels at least at a longitudinally central part of the label when the label is in a plane state; and a pseudo metal mold having a hollow section with an inner surface having a profile substantially corresponding to an outer profile of the pseudo-core and an aperture communicating with the hollow section arranged at a part thereof, wherein the label is held by the sucking/holding member at least at a longitudinally central part of the label and introduced while being held into the hollow section through the aperture, and wherein the label is then held in the pseudo metal mold along an inner surface of the hollow section while being elastically deformed;

wherein the holding member holds the label in a horizontal state at least at the longitudinally central part of the label by sucking and holding the label while the holding member is controlled to move to a pseudo-core side, the held label is inserted into the hollow section through the aperture so as to hold the label in a state in which the label is tightly adhered to the inner surface of the hollow section, and then the pseudo core is controlled to move to enter the hollow section of the pseudo metal mold in which the label is held on the inner surface, and the label is then transferred to the outer peripheral surface of the pseudo-core and thereby supplied to the pseudo-core.

2. The apparatus according to claim 1, wherein the pseudo metal mold is arranged to suck and hold the label while being resiliently deformed as the label is introduced into the hollow section through the aperture under pressure, and causes the label to be tightly adhered to the inner surface of the hollow section.

3. The apparatus according to claim 2, wherein the holding member is configured with three sucking/holding members that suck and hold the label at both end parts and the central part in a longitudinal direction of the label, and the sucking/holding member located at the central part in the longitudinal direction is disposed at a different level in terms of height with respect to sucking/holding positions by the sucking/holding members at both end parts in the longitudinal direction such that the central part in the longitudinal direction of the label first enters the hollow section of the pseudo metal mold.

4. The apparatus according to claim 1, wherein the holding member is configured with three sucking/holding members that suck and hold the label at both end parts and the central part in a longitudinal direction of the label, and the sucking/holding member located at the central part in the longitudinal direction is disposed at a different level in terms of height with respect to sucking/holding positions by the sucking/holding members at both end parts in the longitudinal direction such that the central part in the longitudinal direction of the label first enters the hollow section of the pseudo metal mold.

* * * * *